US011476798B2

(12) United States Patent
Yu et al.

(10) Patent No.: US 11,476,798 B2
(45) Date of Patent: Oct. 18, 2022

(54) TRANSFORMER, AND POWER CONVERSION APPARATUS OR PHOTOVOLTAIC MODULE INCLUDING THE SAME

(71) Applicant: LG Electronics Inc., Seoul (KR)

(72) Inventors: Sunho Yu, Seoul (KR); Daihyun Kim, Seoul (KR); Hyeonggu Han, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 16/598,548

(22) Filed: Oct. 10, 2019

(65) Prior Publication Data

US 2020/0119687 A1    Apr. 16, 2020

(30) Foreign Application Priority Data

Oct. 10, 2018 (KR) .......................... 10-2018-0120703

(51) Int. Cl.
| | |
|---|---|
| *H01F 27/04* | (2006.01) |
| *H02S 40/32* | (2014.01) |
| *H02S 40/36* | (2014.01) |
| *H01F 27/28* | (2006.01) |
| *H01F 27/24* | (2006.01) |
| *H01F 27/02* | (2006.01) |

(52) U.S. Cl.
CPC ............ *H02S 40/32* (2014.12); *H01F 27/02* (2013.01); *H01F 27/24* (2013.01); *H01F 27/28* (2013.01); *H02S 40/36* (2014.12)

(58) Field of Classification Search
USPC ........ 336/180, 221, 185, 195, 196, 197, 198
See application file for complete search history.

(56) References Cited

U.S. PATENT DOCUMENTS

| | | | | |
|---|---|---|---|---|
| 4,498,067 A | * | 2/1985 | Kumokawa | ............... H01F 5/00 336/192 |
| 4,613,841 A | * | 9/1986 | Roberts | ................. H01F 17/043 336/160 |

(Continued)

FOREIGN PATENT DOCUMENTS

| | | |
|---|---|---|
| KR | 2020000014071 | 7/2000 |
| KR | 101452826 | 10/2014 |

(Continued)

*Primary Examiner* — Shawki S Ismail
*Assistant Examiner* — Kazi S Hossain
(74) *Attorney, Agent, or Firm* — Fish & Richardson P.C.

(57) ABSTRACT

Disclosed are a transformer, and a power conversion apparatus or a photovoltaic module including the same. The transformer includes a first core including a base, a first protrusion member to protrude from the base, and a first external wall spaced apart from the first protrusion member and to surround the first protrusion member, a first winding wound in the first core, a second core including a second base, a second protrusion member to protrude from the second base, and a second external wall spaced apart from the second protrusion member and to surround the second protrusion member, a second winding wound in the second core, and a barrier rib configured to separate the first winding and the second winding from each other. Thus, ease of processing is achieved and radiation of electromagnetic noise is reduced.

20 Claims, 29 Drawing Sheets

(56) References Cited

U.S. PATENT DOCUMENTS

| | | | | |
|---|---|---|---|---|
| 4,910,488 | A * | 3/1990 | Davis | G01D 5/2216 |
| | | | | 336/83 |
| 7,427,909 | B2 * | 9/2008 | Ono | H01F 1/15366 |
| | | | | 336/90 |
| 2008/0212341 | A1 * | 9/2008 | Moiseev | H01F 27/34 |
| | | | | 363/21.04 |
| 2011/0074533 | A1 * | 3/2011 | Phadke | H01F 27/36 |
| | | | | 336/150 |
| 2014/0254191 | A1 * | 9/2014 | Yasuike | G10K 9/13 |
| | | | | 381/400 |
| 2016/0285387 | A1 * | 9/2016 | Rodriguez | H02M 1/12 |
| 2017/0092410 | A1 * | 3/2017 | Sado | H01F 27/255 |
| 2018/0082782 | A1 * | 3/2018 | Naruse | H01F 38/14 |

FOREIGN PATENT DOCUMENTS

| | | |
|---|---|---|
| KR | 101753189 | 7/2017 |
| KR | 1020170087696 | 7/2017 |
| WO | WO2017192489 | 11/2017 |

* cited by examiner

TRANSFORMER, AND POWER CONVERSION APPARATUS OR PHOTOVOLTAIC MODULE INCLUDING THE SAME

CROSS-REFERENCE TO RELATED APPLICATION

This application claims the priority benefit of Korean Patent Application No. 10-2018-0120703, filed on Oct. 10, 2018, the disclosure of which is incorporated herein by reference in its entirety.

BACKGROUND OF THE INVENTION

1. Field of the Invention

The present disclosure relates to a transformer, and a power conversion apparatus or photovoltaic module including the same, and more particularly, to a transformer, and a power conversion apparatus or photovoltaic module including the same for achieving ease of processing and reducing radiation of electromagnetic noise.

2. Description of the Related Art

A power conversion apparatus is employed to provide alternating current (AC) power in a photovoltaic module for producing new and renewable energy.

In particular, a transformer, a leakage inductor, or the like is used in a converter to convert direct current (DC) power produced by a photovoltaic module or the like.

When a general resonance type transformer is used, a winding space of a transformer is divided into an upper layer and a lower layer, and an air gap is disposed between the upper layer and the lower layer. However, in this case, a central first core space is fixed, and thus there is a problem in that it is not easy to adjust leakage inductance, which is disadvantageous.

When a transformer and a leakage inductor are each installed on a circuit board, a large volume is occupied.

Thus, in order to miniaturize a power conversion apparatus that is to be integrally combined with a photovoltaic module, there has been an attempt to miniaturize the size of a transformer, or a leakage inductor, and in particular, research has been conducted into an integrated type transformer designed by integrating a transformer and a leakage inductor.

U.S. Patent Publication No. US20140313004 discloses an integrated type transformer. However, in the integrated type transformer, a circular internal wall and a second circular internal wall surrounding the same are disposed within an external wall of a first core. However, because the internal wall and the second internal wall, which form leakage inductance, form a circular shape, it is not easy to process the internal walls, and accordingly, leakage inductance is not capable of being easily adjusted to meet design specifications.

SUMMARY OF THE INVENTION

Therefore, the present disclosure has been made in view of the above problems, and it is an object of the present disclosure to provide a transformer, and a power conversion apparatus or photovoltaic module including the same for achieving ease of processing and reducing radiation of electromagnetic noise.

It is another object of the present disclosure to provide a transformer, and a power conversion apparatus or photovoltaic module including the same for reducing winding loss.

It is another object of the present disclosure to provide a transformer, and a power conversion apparatus or photovoltaic module including the same for reducing copper loss by equalizing the lengths of the first winding and the second winding.

It is another object of the present disclosure to provide a transformer, and a power conversion apparatus or photovoltaic module including the same for reducing the size of a transformer in a photovoltaic module.

It is another object of the present disclosure to provide a transformer including a leakage inductor integrated therewith, and a power conversion apparatus or photovoltaic module including the same.

In accordance with the present disclosure, the above and other objects can be accomplished by the provision of a transformer, a power conversion apparatus or a photovoltaic module including the transformer may include a first core including a base, a first protrusion member to protrude from the base, and a first external wall spaced apart from the first protrusion member and to surround the first protrusion member, a first winding wound in the first core, a second core including a second base, a second protrusion member to protrude from the second base, and a second external wall spaced apart from the second protrusion member and to surround the second protrusion member, a second winding wound in the second core, and a barrier rib configured to separate the first winding and the second winding from each other.

An opening may be formed in the barrier rib at a position corresponding to the first protrusion member and the second protrusion member.

The barrier rib may include a magnetic material.

The first winding and the second winding may be the same length.

A first opening for the first winding may be formed in the first core, and a second opening for the second winding may be formed in the second core.

The first opening may be formed in the base of the first core, and the second opening may be formed in the second external wall of the second core.

The first opening may be formed in the base of the first core, and the second opening may be formed in the second base of the second core.

The first core and the second core may be the same height.

The base, the first protrusion member, and the external wall may be formed of the same material.

The second base, the second protrusion member, and the second external wall may be formed of the same material.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

The specification proposes an integrated type transformer for ease of processing and easily adjusting leakage inductance according to design specification.

Hereinafter, the present disclosure will be described in more detail with reference to the drawings.

The suffixes "module" and "unit" of elements herein are used for convenience of description and thus can be used interchangeably and do not have any distinguishable meanings or functions. Thus, the suffixes "module" and "unit" of elements herein are used interchangeably.

Figure 1:
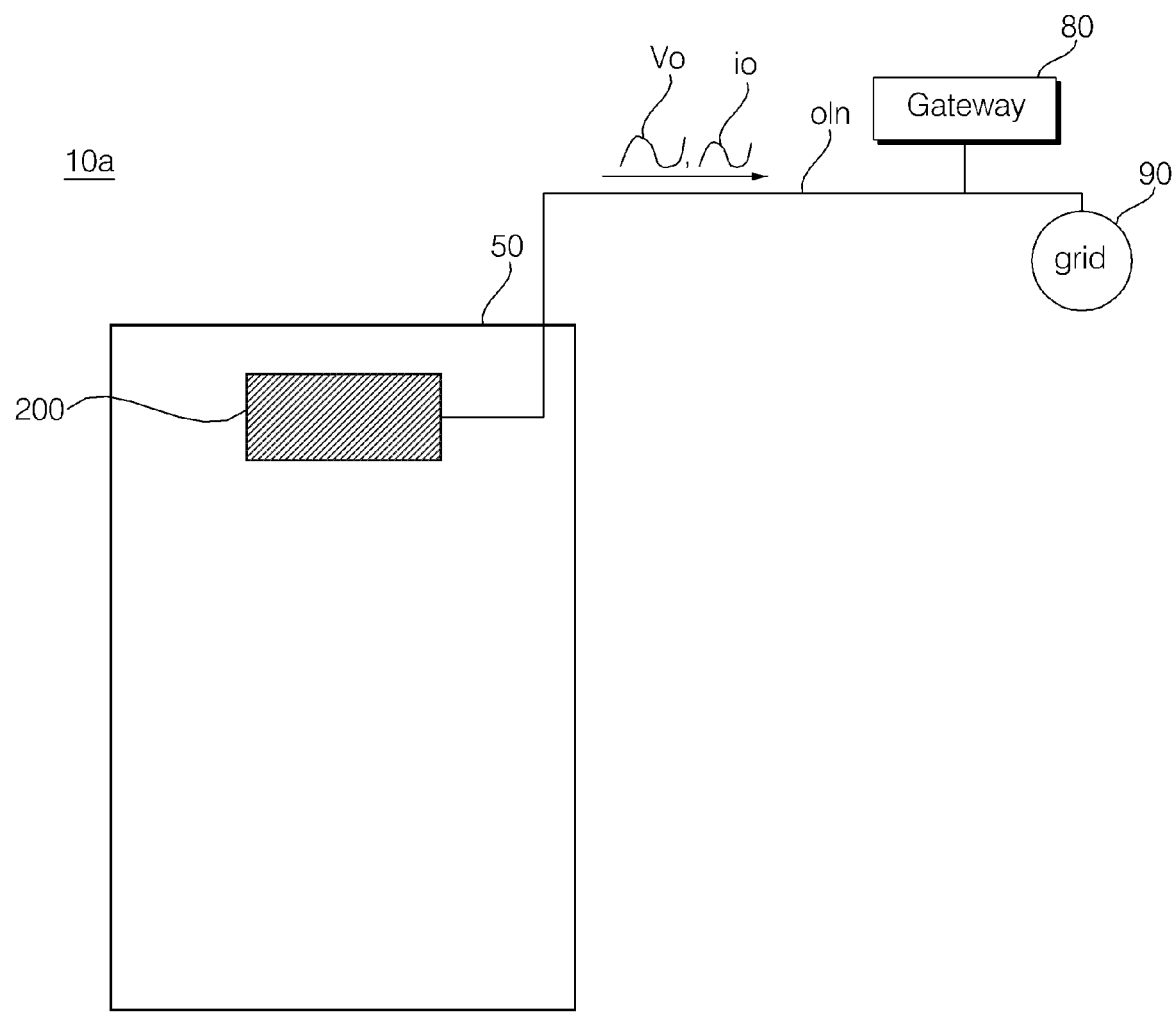
FIG. 1 is a diagram showing an example of a photovoltaic system including a photovoltaic module according to an embodiment of the present disclosure.

FIG. 1 is a diagram showing an example of a photovoltaic system including a photovoltaic module according to an embodiment of the present disclosure.

Referring to the drawing, a photovoltaic system 10a according to an embodiment of the present disclosure may include a photovoltaic module 50 and a gateway 80.

The photovoltaic module 50 may include a solar cell module 100, and a junction box 200 including a power conversion apparatus 500 (refer to FIG. 6) for converting direct current (DC) power from a solar cell module into alternating current (AC) power and outputting the AC power, which are integrated with each other.

Although the drawing illustrates the junction box 200 attached to a bottom surface of the solar cell module 100, the present disclosure is not limited thereto. The junction box 200 may be configured separately and may be spaced apart from the solar cell module 100.

A cable oln for supplying the AC power output from the junction box 200 may be conductively connected to an output end of the junction box 200.

The gateway 80 may be positioned between the junction box 200 and a grid 90.

The gateway 80 may detect AC io and an AC voltage Vo, which flows through the cable oln and are output from the photovoltaic module 50.

The gateway 80 may output a power factor adjusting signal for adjusting a power factor based on a phase difference of the AC io and the AC voltage Vo output from the photovoltaic module 50.

To this end, the gateway 80 and the photovoltaic module 50 may perform power line communication (PLC communication) or the like using the cable oln or the like.

The power conversion apparatus 500 (refer to FIG. 6) in the photovoltaic module 50 may convert DC power output from the solar cell module 100 into AC power and may output the converted AC power.

To this end, a converter 530 (refer to FIG. 6) and an inverter 540 (refer to FIG. 6) may be included within the power conversion apparatus 500 (refer to FIG. 6) in the photovoltaic module 50.

The power conversion apparatus 500 (refer to FIG. 6) may also be referred to as a micro inverter. Thus, the micro inverter may include the converter 530 (refer to FIG. 6) and the inverter 540 (refer to FIG. 6).

A transformer and a leakage inductor may be included within the converter 530 of the power conversion apparatus 500 (refer to FIG. 6) or the micro inverter.

In particular, the present disclosure proposes a slimmed transformer in order to slim the power conversion apparatus 500 (refer to FIG. 6) or the micro inverter.

To this end, according to an embodiment of the present disclosure, a transformer UTR, a power conversion apparatus, and a photovoltaic module including the same may include a lower core CREa including a base BAS, a first protrusion member INBa that protrudes from the base BAS, and a first external wall OTBa that is spaced apart from the first protrusion member INBa and surrounds the first protrusion member INBa, a first winding CLE1 wound in the lower core CREa, an upper core CREb including a second base BASb, a second protrusion member INBb that protrudes from the second base BASb, and a second external wall OTBb that is spaced apart from the second protrusion member INBb and surrounds the second protrusion member INBb, a second winding CLE2 wound in the upper core CREb, and a barrier rib MID for separating the first winding CLE1 and the second winding CLE2 from each other. Thus, ease of processing may be achieved and radiation of electromagnetic noise may be reduced. A winding extends to the outside through an opening, and thus it is not required to perform separate abrasion processing and the like on a protrusion member, an external wall, or the like, and winding loss may be reduced.

The size of the transformer UTR in the photovoltaic module may be reduced, and the transformer UTR including the leakage inductor integrated therewith may be manufactured.

An opening OPd may be formed in the barrier rib MID at a position corresponding to the first protrusion member INBa and the second protrusion member INBb. Thus, ease of processing may be achieved and radiation of electromagnetic noise may be reduced.

The barrier rib MID may include a magnetic material. Thus, the first winding CLE1 and the second winding CLE2 may be spaced apart from each other, and inductance may be adjusted.

The first winding CLE1 and the second winding CLE2 may be the same length. Thus, copper loss due to windings may be reduced.

A first opening OPa1 for the first winding CLE1 may be formed in the lower core CREa, and a second opening OPa2 for the second winding CLE2 may be formed in the upper core CREb. Thus, ease of processing may be achieved and radiation of electromagnetic noise may be reduced.

Figure 6:
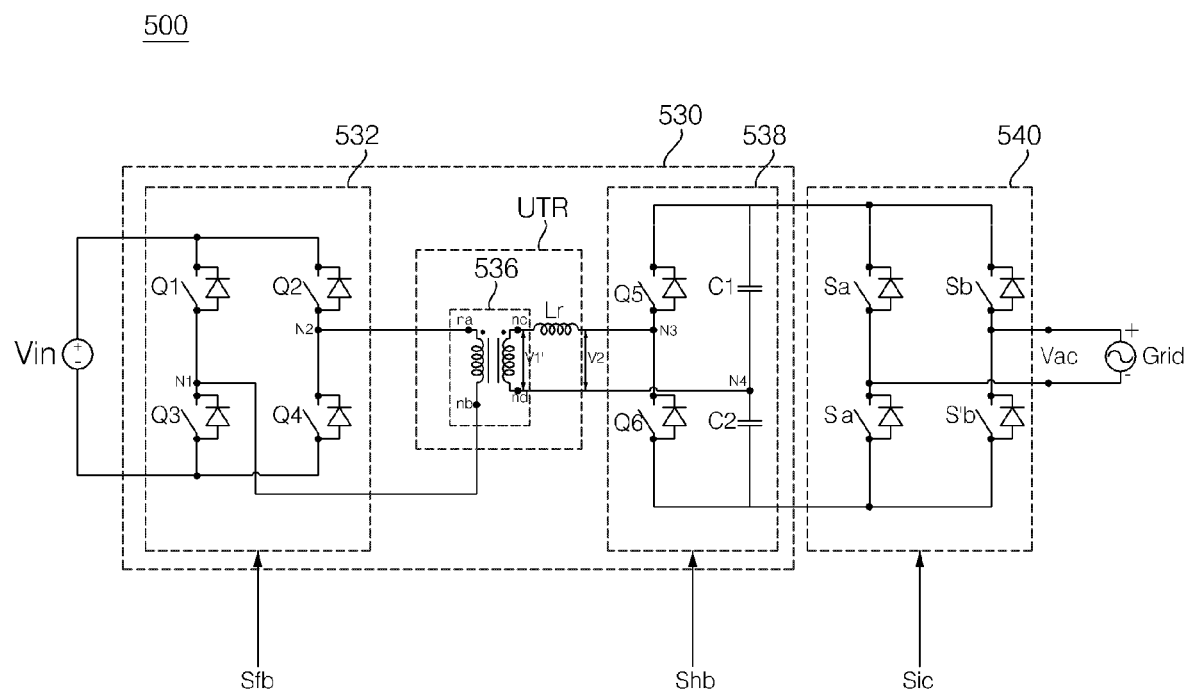
FIG. 6 is a circuit board of a power conversion apparatus in a photovoltaic module according to an embodiment of the present disclosure.

The present disclosure proposes an integrated type transformer including a leakage inductor integrated therewith in order to slim the power conversion apparatus 500 (refer to FIG. 6). In this case, a transformer for ease of processing may be proposed to adjust leakage inductance in an integrated type transformer according to design specifications, which will be described below with reference to FIGS. 9 to 14B and the like.

Figure 2:
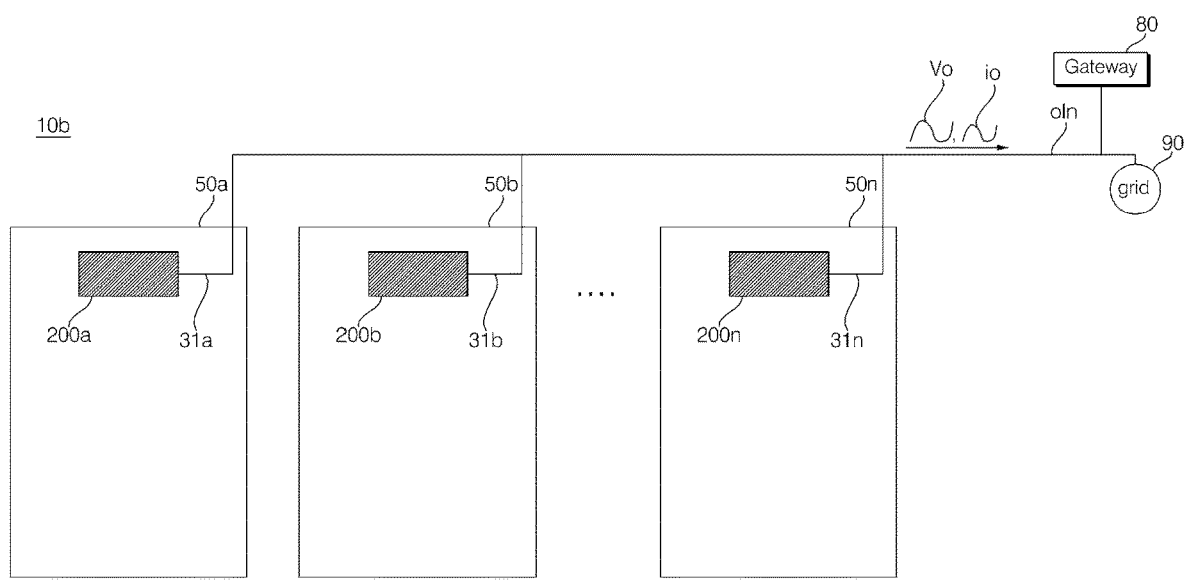
FIG. 2 is a diagram showing another example of a photovoltaic system including a photovoltaic module according to an embodiment of the present disclosure.

Then, FIG. 2 is a diagram showing another example of a photovoltaic system including a photovoltaic module according to an embodiment of the present disclosure.

Referring to the drawing, a photovoltaic system 10b according to an embodiment of the present disclosure may include a plurality of photovoltaic modules 50a, 50b, . . . , and 50n, and the gateway 80.

Unlike the photovoltaic system 10a of FIG. 1, the photovoltaic system 10b of FIG. 2 may be configured in such a way that the plurality of photovoltaic modules 50a, 50b, and 50n are connected in parallel.

The plurality of photovoltaic modules 50a, 50b, . . . , and 50n may include respective solar cell modules 100a, 100b, and 100n, and junction boxes 200a, 200b, . . . , and 200n, each including a circuit device for converting DC power and outputting the converted power in the solar cell module.

Although the junction boxes 200a, 200b, . . . , and 200n are attached to bottom surface of the respective solar cell modules 100a, 100b, . . . , and 100n in the drawing, the present disclosure is not limited thereto. The junction boxes 200a, 200b, . . . , and 200n may be separately disposed to be spaced apart from the respective solar cell modules 100a, 100b, . . . , and 100n.

Cables 31a, 31b, . . . , and o1n for supplying AC power output from the junction boxes 200a, 200b, . . . , and 200n to a grid may be conductively connected to output ends of the junction boxes 200a, 200b, . . . , and 200n, respectively.

Each of the plurality of photovoltaic modules 50a, 50b, . . . , and 50n of FIG. 2 may include a power conversion apparatus. According to an embodiment of the present disclosure, each power conversion apparatus may include an integrated type transformer.

Figure 3:
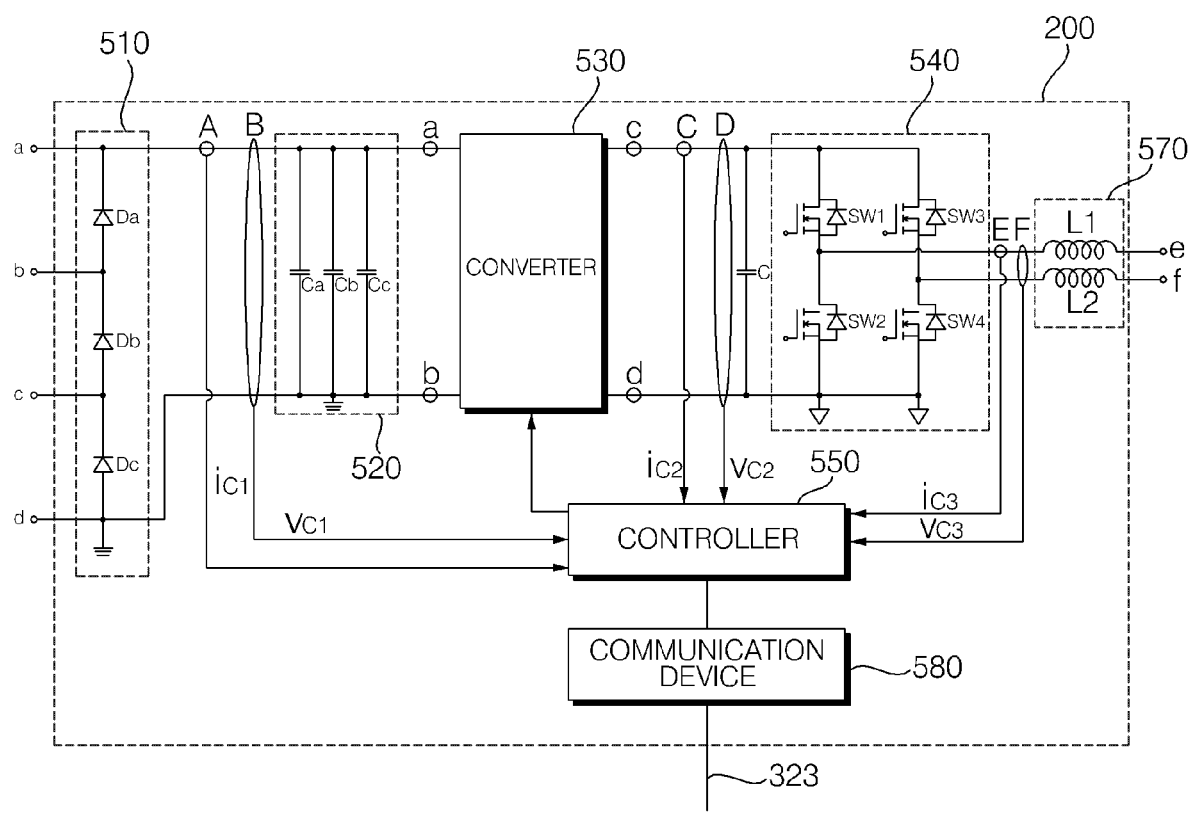
FIG. 3 is a circuit diagram of an internal part of a junction box in the photovoltaic module of FIG. 1 or 2.

FIG. 3 is a circuit diagram of an internal part of a junction box in the photovoltaic module of FIG. 1 or 2.

Referring to the drawing, the junction box 200 may convert DC power from the solar cell module 100 and may output the converted power.

In particular, with regard to the present disclosure, the junction box 200 may include a power conversion apparatus for outputting AC power.

To this end, the junction box 200 may include the converter 530, an inverter 540, and a controller 550 for controlling the converter 530 and the inverter 540.

The junction box 200 may further include a bypass diode unit 510 for bypass, a capacitor unit 520 for storing DC power, and a filter unit 570 for filtering output AC power.

The junction box 200 may further include a communication device 580 for communication with the external gateway 80.

The junction box 200 may further include an input current detector A, an input voltage detector B, a converter output current detector C, a converter output voltage detector D, an inverter output current detector E, and an inverter output voltage detector F.

The controller 550 may control the converter 530, the inverter 540, and the communication device 580.

The bypass diode unit 510 may include bypass diodes Dc, Db, and Da that are each disposed between first to fourth conductive lines (not shown) of the solar cell module 100. In this case, the number of bypass diodes may be one or more and may be less than the number of conductive lines by as much as one.

The bypass diodes Dc, Db, and Da may receive solar DC power from the solar cell module 100, in particular, from first to fourth conductive lines (not shown) in the solar cell module 100. When inverse voltage is generated in DC power from at least one of first to fourth conductive lines (not shown), the bypass diodes Dc, Db, and Da may bypass the inverse voltage.

DC power transmitted through the bypass diode unit 510 may be input to the capacitor unit 520.

The capacitor unit 520 may store input DC power that is input through the solar cell module 100 and the bypass diode unit 510.

Although the capacitor unit 520 includes a plurality of capacitors Ca, Cb, and Cc connected in parallel in the drawing, differently therefrom, the plurality of capacitors may be connected in a combination of serial and parallel connection or may be connected in series to a ground terminal. Alternatively, the capacitor unit 520 may include only a single capacitor.

The converter 530 may convert the level of an input voltage from the solar cell module 100 through the bypass diode unit 510 and the capacitor unit 520.

In particular, the converter 530 may convert power using the DC power stored in the capacitor unit 520.

The converter 530 according to an embodiment of the present disclosure will be described in more detail with reference to FIG. 6.

Switching devices in the converter 530 may perform an on/off operation based on a converter switching control signal from the controller 550. Thus, level-converted DC power may be output.

The inverter 540 may convert the DC power converted by the converter 530 into AC power.

The drawing illustrates a full bridge inverter. That is, upper switching devices Sa and Sb, and lower switching devices S'a and S'b, which are respectively connected in series to each other, and both pairs of upper and lower switching devices may be connected in parallel (Sa and S'a, and Sb and S'b). A diode may be connected in inverse-parallel to each of the switching devices Sa, Sb, S'a, and S'b.

The switching devices Sa, Sb, S'a, and S'b in the inverter 540 may perform an on/off operation based on an inverter switching control signal from the controller 550. Thus, AC power with a predetermined frequency may be output. In detail, the output AC power may be the same frequency (about 60 Hz or 50 Hz) as an AC frequency of a grid.

A capacitor C may be disposed between the converter 530 and the inverter 540.

The capacitor C may store the level-converted DC power of the converter 530. Opposite ends of the capacitor C may be referred to as a dc end, and thus the capacitor C may also be referred to as a dc-end capacitor.

The input current detector A may detect input current ic1 supplied to the capacitor unit 520 from the solar cell module 100.

The input voltage detector B may detect an input voltage Vc1 supplied to the capacitor unit 520 from the solar cell module 100. Here, the input voltage Vc1 may be the same as a voltage stored at the opposite ends of the capacitor unit 520.

The detected input current ic1 and input voltage Vc1 may be input to the controller 550.

The converter output current detector C may detect output current ic2, that is, dc-end current output from the converter 530, and the converter output voltage detector D may detect an output voltage vc2, that is, a dc-end voltage output from the converter 530. The detected output current ic2 and output voltage vc2 may be output to the controller 550.

The inverter output current detector E may detect current ic3 output from the inverter 540, and the inverter output voltage detector F may detect a voltage vc3 output from the inverter 540. The detected current ic3 and voltage vc3 may be input to the controller 550.

The controller 550 may output a control signal for controlling switching devices of the converter 530. In particular, the controller 550 may output an on timing signal of switching devices in the converter 530 based on at least one of the detected input current ic1, the input voltage Vc1, the output current ic2, the output voltage vc2, the output current ic3, or the output voltage vc3.

The controller 550 may output an inverter control signal for controlling each of the switching devices Sa, Sb, S'a, and S'b of the inverter 540. In particular, the controller 550 may output an on timing signal of each of the switching devices Sa, Sb, S'a, and S'b of the inverter 540 based on at least one of the detected input current ic1, the input voltage Vc1, the output current ic2, the output voltage vc2, the output current ic3, or the output voltage vc3.

The controller 550 may calculate a maximum power point with respect to the solar cell module 100, and accordingly, may control the converter 530 to output DC power corresponding to maximum power.

The communication device 580 may communicate with the gateway 80.

For example, the communication device 580 may exchange data with the gateway 80 through power line communication.

The communication device 580 may also transmit current information, voltage information, power information, or the like of the photovoltaic module 50 to the gateway 80.

The filter unit 570 may be disposed at an output end of the inverter 540.

The filter unit 570 may include a plurality of passive elements and may adjust a phase difference between the AC io and the AC voltage Vo output from the inverter 540 based on at least some of the plurality of passive elements.

Figure 4:
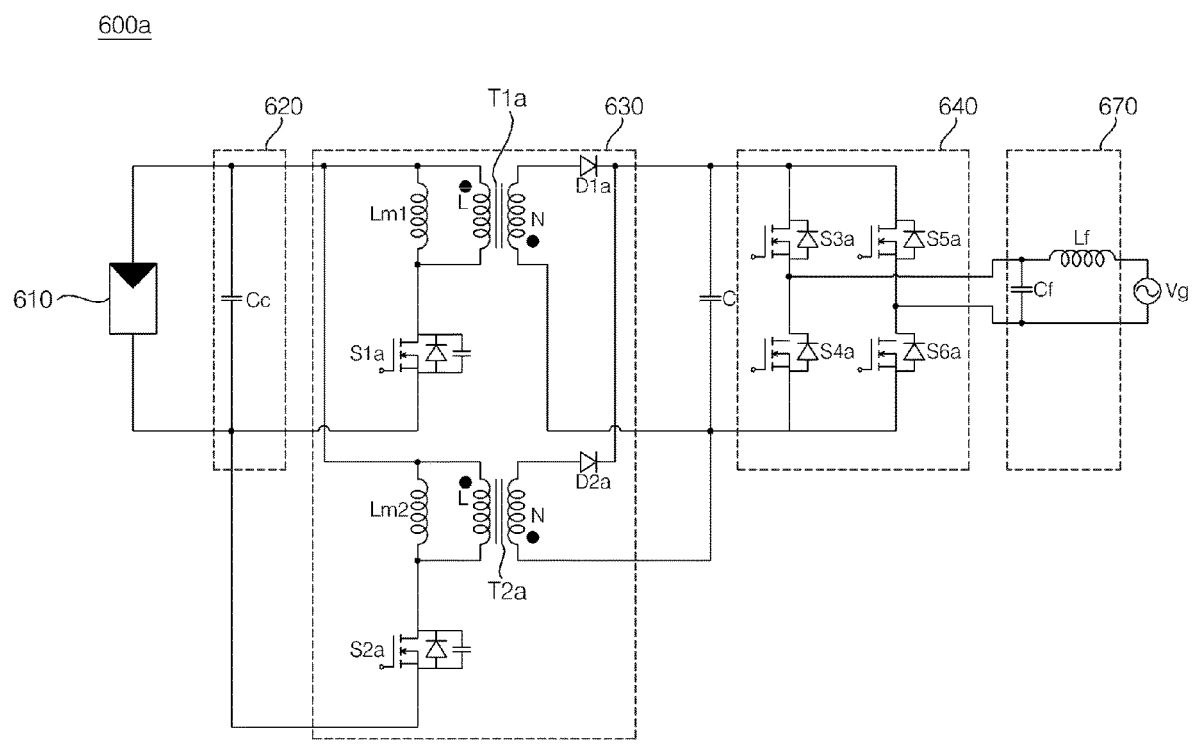
FIGS. 4 and 5 are diagrams showing various examples of a power conversion apparatus of a photovoltaic module.
Figure 5:
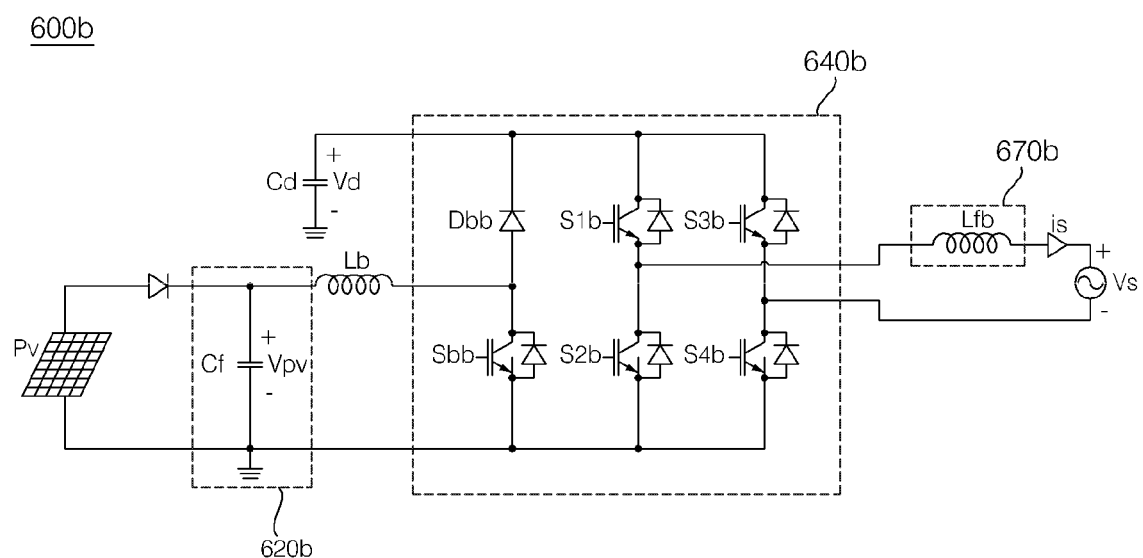

FIGS. 4 and 5 are diagrams showing various examples of a power conversion apparatus of a photovoltaic module.

First, a power conversion apparatus 600a of the photovoltaic module of FIG. 4 may include a capacitor unit 620, a converter 630, an inverter 640, and a filter unit 670.

Because the converter 630 of FIG. 4 may include an interleaved flyback converter, transformers T1a and T1b may be used, and thus input and output sides may be insulated from each other and a voltage conversion ratio is excellent, but there is a disadvantage in that it is difficult to control a power factor pf.

Then, a power conversion apparatus 600b of the photovoltaic module of FIG. 5 may include a capacitor unit 620b, a power conversion unit 640b, and a filter unit 670b.

The power conversion unit 640b of FIG. 5 may further include a diode Dbb and a switching device Sbb as well as switching devices S1b to S4b related to the full bridge inverter.

In the case of the power conversion unit 640b of FIG. 5, it may be possible to control the power factor pf, a voltage conversion ratio may be lowered using a non-isolated type, and there is a disadvantage in that a separate protection circuit board or the like is required to satisfy the rule of leakage current. During switching, hard switching loss may occur due to hard switching, and thus voltage conversion efficiency may be disadvantageously lowered.

The present disclosure proposes a method of stably outputting power in a 2-stage power conversion apparatus. In addition, the present disclosure proposes a method of lowering loss of output power.

Figure 7A:
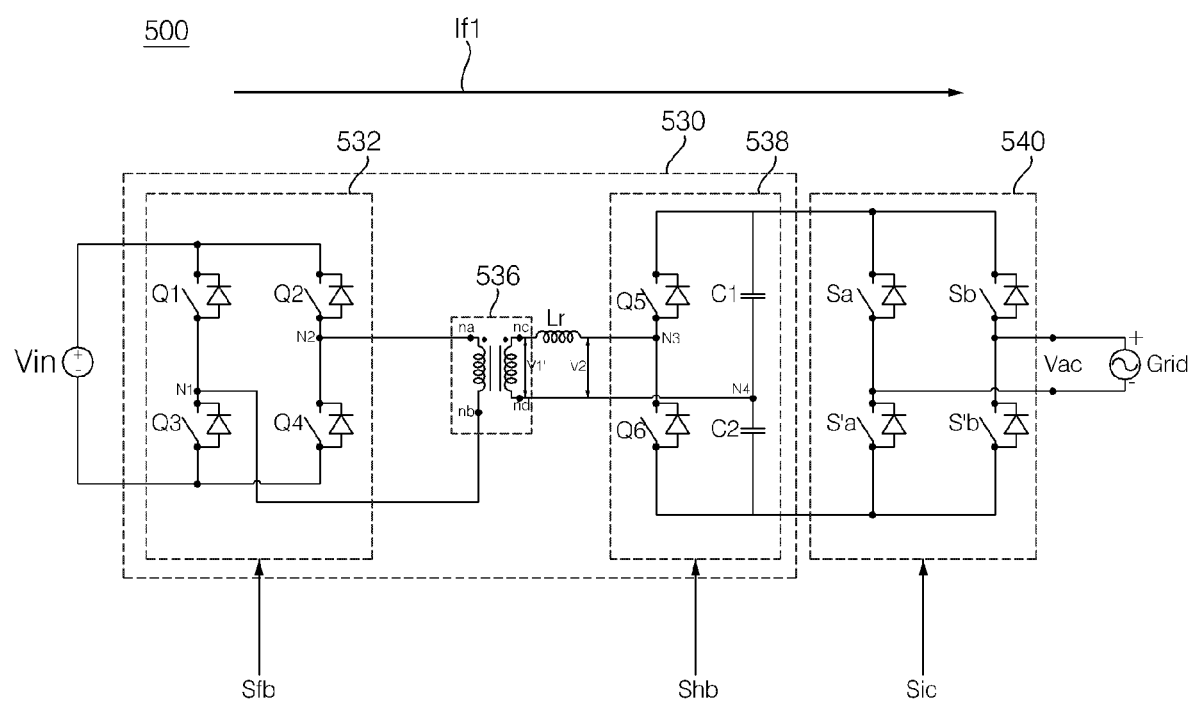
FIGS. 7A and 7B are diagrams for explanation of the power conversion apparatus of FIG. 6.
Figure 7B:
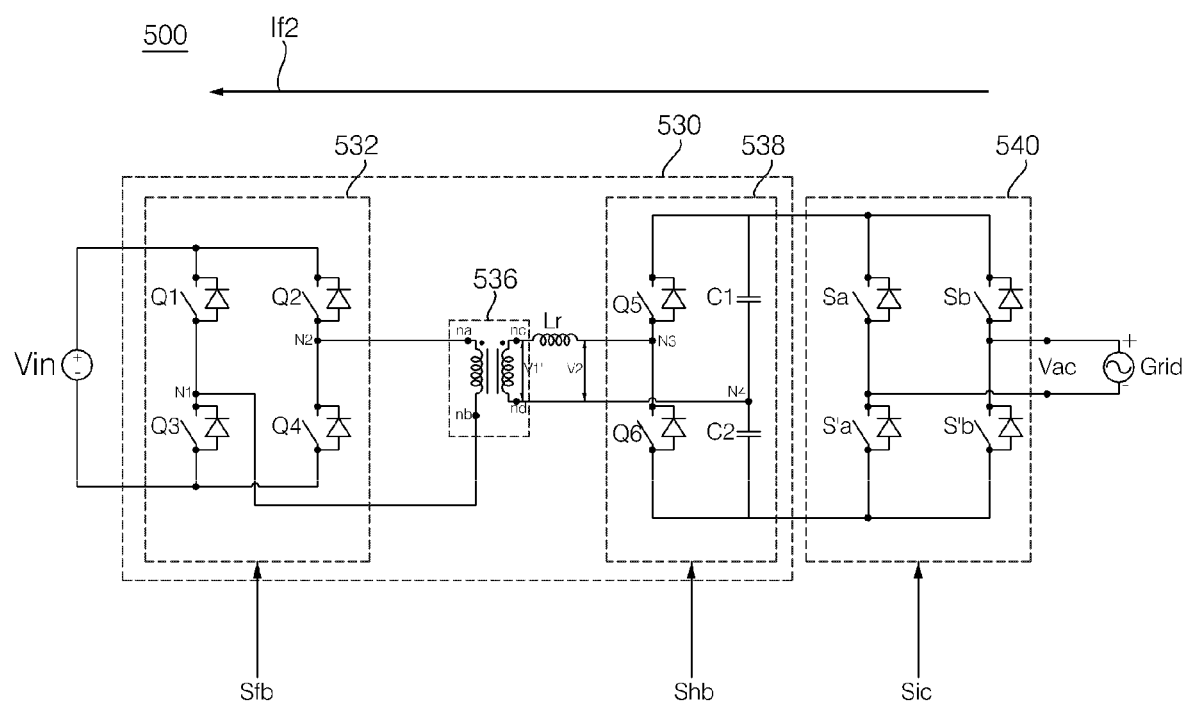

FIG. 6 is a circuit board of a power conversion apparatus in a photovoltaic module according to an embodiment of the present disclosure. FIGS. 7A and 7B are diagrams for explanation of the power conversion apparatus of FIG. 6.

Referring to the drawings, a power conversion apparatus 500 in a photovoltaic module 100 according to an embodiment of the present disclosure may include the bypass diode unit 510, the capacitor unit 520, the controller 550, the communication device 580, the input current detector A, the input voltage detector B, the converter output current detector C, the converter output voltage detector D, the inverter output current detector E, and the inverter output voltage detector F as well as the converter 530 and the inverter 540 illustrated in the drawing.

The filter unit 570 for reducing electromagnetic noise may be further disposed at an output end of the inverter 540. In this case, the filter unit 570 may include at least one inductor.

Hereinafter, embodiments will be described in terms of the converter 530, the inverter 540, and the like shown in FIG. 6.

The power conversion apparatus 500 in the photovoltaic module 100 according to an embodiment of the present disclosure may include the solar cell module 100 including a plurality of solar cells 130, the converter 530, which converts the level of a first DC power Vin input from the solar cell module 100 to output second DC power, the inverter 540 for converting DC power from the converter 530 into AC power Vac, and the controller 550 for controlling the converter 530 and the inverter 540.

The converter 530 according to an embodiment of the present disclosure may include a full bridge switching unit 532 for performing switching on the first DC power Vin, a transformer 536 having input sides na and nb connected to an output end of the full bridge switching unit 532, and a half bridge switching unit 538 connected to output sides nc and nd of the transformer 536.

The controller 550 may perform control to vary a switching frequency of the full bridge switching unit 532 and the half bridge switching unit 538 during first periods Pba and Pbb. Accordingly, when input DC power Vin from the solar cell module 100 is low, stable power may also be output irrespective of limitations of power to be output.

Switching loss in the 2-stage power conversion apparatus may be reduced.

The converter 530 in the power conversion apparatus 500 in the photovoltaic module 100 may further include an inductor Lr connected between the transformer 536 and the half bridge switching unit 538.

In this case, the inductor Lr may be required to transfer energy between the transformer 536 and the half bridge switching unit 538.

In particular, the inductor Lr may provide leakage inductance and may be used for resonance in a resonance type converter.

The present disclosure proposes an integrated type transformer module UTR including the transformer 536 and the leakage inductor Lr, which are integrated with each other in order to slim the power conversion apparatus 500, which will be described with reference to FIG. 9.

Referring to the drawing, the full bridge switching unit 532 may include first and second switching devices Q1 and Q2, which are connected in parallel, and third and fourth switching devices Q3 and Q4, which are connected in series to the first and second switching devices Q1 and Q2, respectively.

The input sides na and nb of the transformer 536 may be connected between a first node N1 between the first switching device Q1 and the second switching device Q2, and a second node N2 between the third switching device Q3 and the fourth switching device Q4.

Referring to the drawing, the half bridge switching unit 538 may include a fifth switching device Q5 and a sixth switching device Q6 that are connected in series to each other, and a first capacitor C1 and a second capacitor C2 that are connected in series to each other.

In this case, the fifth switching device Q5 and the sixth switching device Q6 may be connected in parallel to the first capacitor C1 and the second capacitor C2.

The output sides nc and nd of the transformer 536 may be connected between a third node N3 between the fifth switching device Q5 and the sixth switching device Q6, and a fourth node N4 between the first capacitor C1 and the second capacitor C2.

The controller 550 may output a switching control signal Sfb for switching the full bridge switching unit 532.

The controller 550 may output a switching control signal Shb for switching the half bridge switching unit 538.

The controller 550 may output a switching control signal Sic for switching the inverter 540.

The controller 550 may perform control to vary a switching frequency of the full bridge switching unit 532 and the half bridge switching unit 538 according to a waveform of the output voltage Vac of the inverter 540.

FIG. 7A illustrates an example of a waveform when current flows to the inverter 540 from the converter 530. FIG. 7B illustrates an example of a waveform when current flows to the converter 530 from the inverter 540. In this case, the inverter 540 may be a bi-directional inverter. The converter 530 may be a bi-directional converter.

For comparison with the integrated type transformer of FIG. 6, a conventional transformer of FIGS. 8A and 8B will be described.

FIGS. 8A to 8D are diagrams for explanation of a transformer.

Figure 8A:
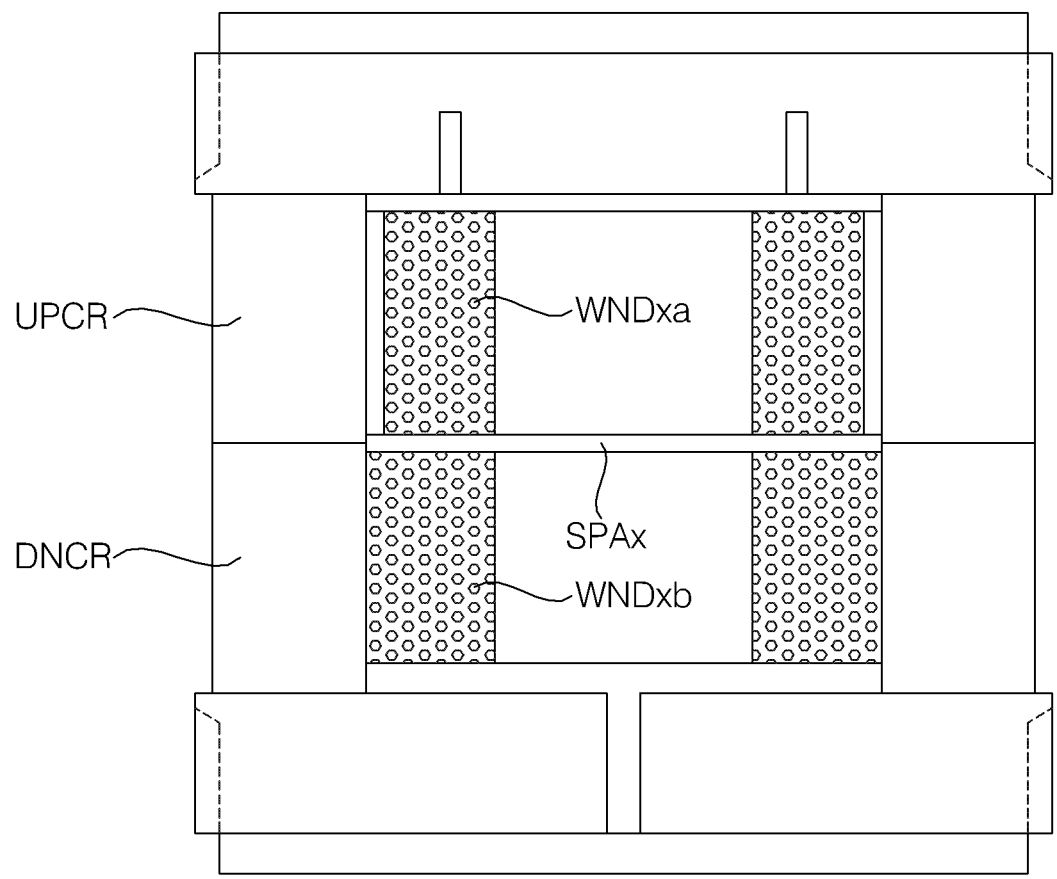
FIGS. 8A to 8D are diagrams for explanation of a transformer.

First, FIG. 8A illustrates an example of a general resonance type transformer TRxa.

Referring to the drawings, the general resonance type transformer TRxa may be divided into an upper first core UPCR, an upper winding WNDXa wound around a bobbin, a lower first core DNCR, and a lower winding WNDXb wound around the bobbin, and an air gap SPAx may be disposed between upper and lower sides. However, in this case, the central first core space is fixed, and thus, there is a disadvantage in that it is not easy to adjust leakage inductance.

Figure 8B:
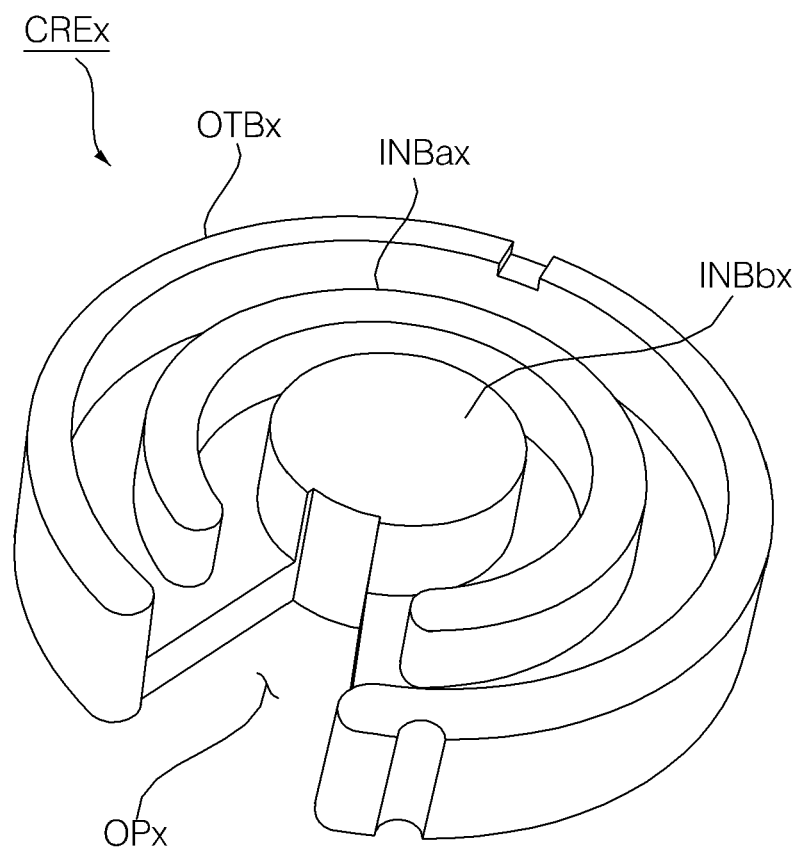
Figure 8C:
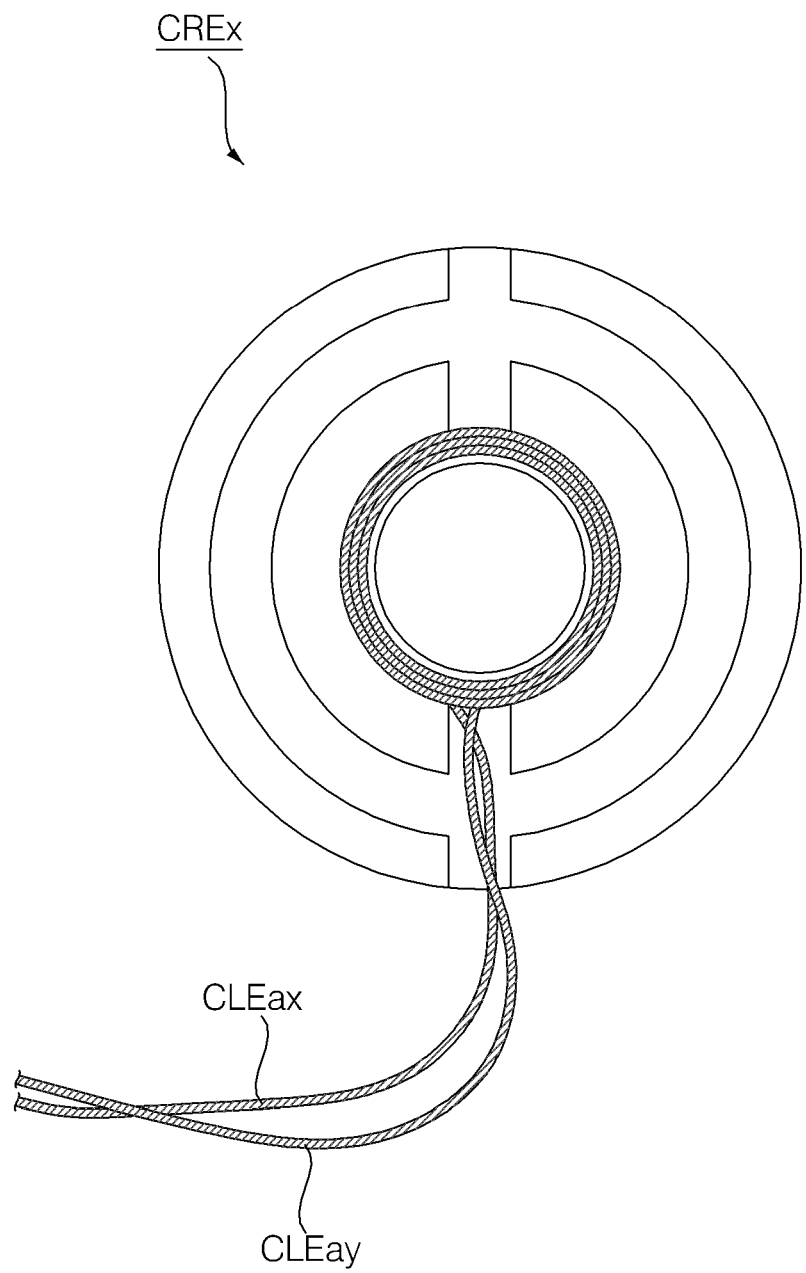

Then, FIGS. 8B and 8C are diagrams showing an example of an integrated type transformer.

Referring to the drawings, an internal first core CREx of the integrated type transformer may include an external wall OTBx, and a circular internal wall INBbx and a second circular internal wall INBax, which surrounds the circular internal wall INBbx in the external wall OTBx. However, the internal wall INBbx and the second internal wall INBax, which form leakage inductance have a circular shape, and thus may not be easily processed and the leakage inductance may not be easily adjusted to meet design specifications.

An opening OPx is formed in only one side, and thus, as shown in FIG. 8C, conductive lines CLE1x and CLE1y are conductively connected to a winding through a single opening OPx, and thus the risk of short may be increased.

To form the opening OPx, extensive processing such as cutting may be required, and coupling of windings and coupling of the conductive lines CLE1x and CLE1y may be externally performed, and thus a very long length of the winding may be required, which is disadvantageous.

Figure 8D:
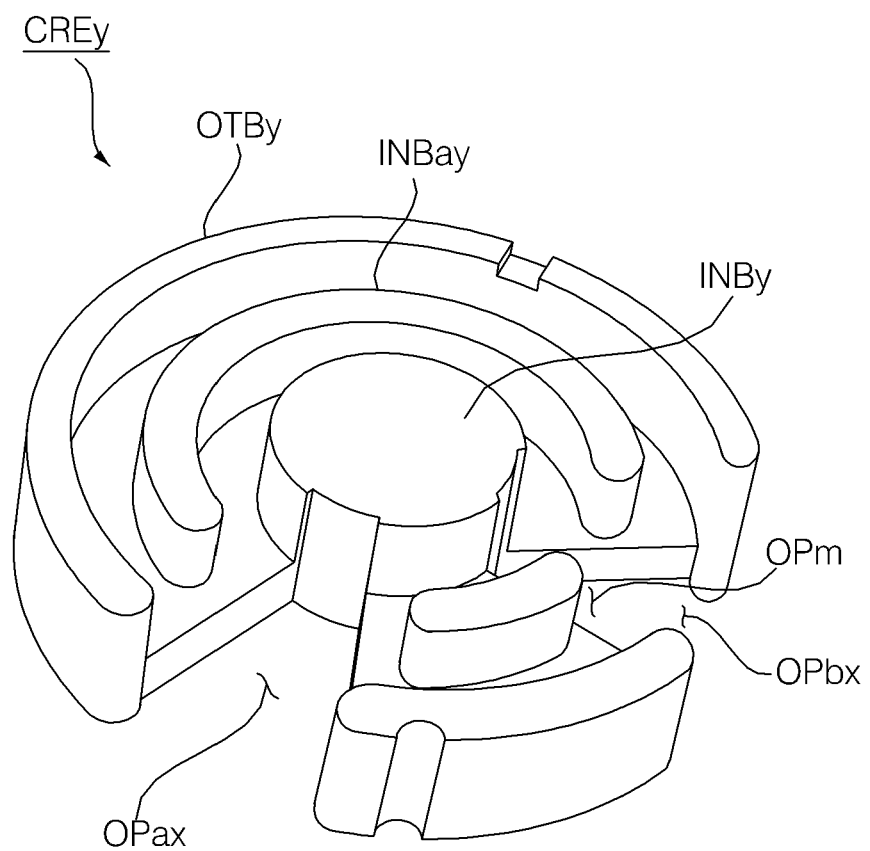

Then, FIG. 8D is a diagram showing another example of an integrated type transformer.

Referring to the drawing, similarly to the internal first core CREx of the integrated type transformer, an internal first core CREy of the integrated type transformer may include an external wall OTBy, and a circular internal wall INBby and a second circular internal wall INBay surrounding the circular internal wall INBby, which are disposed in the external wall OTBy.

Unlike the internal first core CREx of FIG. 8a, the internal first core CREy of FIG. 8D may be configured in such a way that respective openings OPm and OPbx are formed in the second internal wall INBay and the external wall OTBy. Accordingly, the first winding and the second winding may extend to the outside through an opening OPax, and the openings OPm and OPbx, respectively.

However, due to the configuration of the internal first core CREy, the relative magnitude of leakage inductance may not be greatly increased relatively, and heat dissipation efficiency may be reduced and electromagnetic noise may be radiated to the outside due to an empty space such as the opening OPax, or the openings OPm and OPbx.

To form the opening OPax, the openings OPm and OPbx, or the like, additional processing such as cutting may be disadvantageously required.

The windings and the like need to extend to the outside and to be coupled, and thus the length of the windings may be disadvantageously increased to cause winding loss.

Accordingly, hereinafter, the configuration of a transformer for achieving ease of processing and reducing radiation of electromagnetic noise will be proposed.

Figure 9:
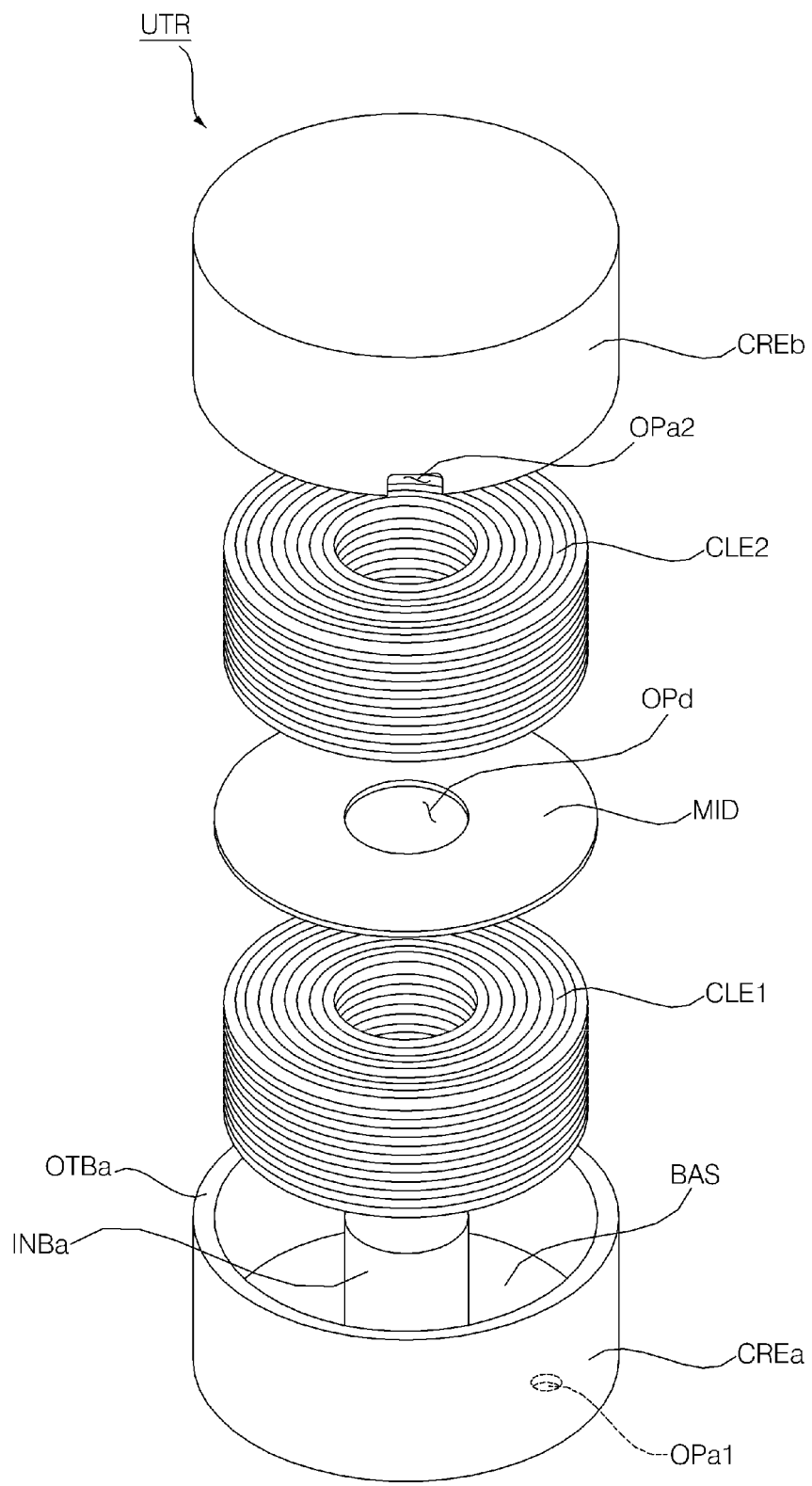
FIG. 9 is a diagram showing a transformer according to an embodiment of the present disclosure.

FIG. 9 is a diagram showing a transformer according to an embodiment of the present disclosure. FIGS. 10A to 11B are diagram for explanation of FIG. 9.

First, referring to FIG. 9, the transformer UTR according to an embodiment of the present disclosure may include the lower core CREa, the upper core CREb, the first winding CLE1 wound in the lower core CREa, a second winding CRE2 wound in the upper core CREb, and the barrier rib MID for separating the first winding CLE1 and the second winding CLE2 from each other.

First, the lower core CREa may include the base BAS, the first protrusion member INBa, which protrudes from the base BAS, and the first external wall OTBa, which is spaced apart from the first protrusion member INBa and surrounds the first protrusion member INBa.

Then, the upper core CREb may include the second base BASb, the second protrusion member INBb, which protrudes from the second base BASb, and the second external wall OTBb, which is spaced apart from the second protrusion member INBb and surrounds the second protrusion member INBb.

The first winding CLE1 may be wound in the lower core CREa, and the second winding CRE2 may be wound in the upper core CREb.

Although an example of the present disclosure proposes a circular shape as a shape of a core and shapes of internal and external walls surrounding the core, the shapes may be modified to an oval shape, a polygonal shape, or the like.

In this case, the barrier rib MID may separate the first winding CLE1 and the second winding CLE2 from each other. Thus, ease of processing may be achieved and radiation of electromagnetic noise may be reduced.

The size of the transformer in the photovoltaic module may be reduced, and a transformer including a leakage inductor integrated therewith may be manufactured.

The opening OPd may be formed in the barrier rib MID at a position corresponding to the first protrusion member INBa and the second protrusion member INBb. Thus, ease of processing may be achieved and radiation of electromagnetic noise may be reduced.

The barrier rib MID may include a magnetic material. Thus, the first winding CLE1 and the second winding CLE2 may be spaced apart from each other, and inductance may be adjusted.

The first winding CLE1 and the second winding CLE2 may be the same length. Thus, copper loss due to windings may be reduced.

The first opening OPa1 for the first winding CLE1 may be formed in the lower core CREa, and the second opening OPa2 for the second winding CLE2 may be formed in the upper core CREb. Thus, the winding may extend to the outside through an opening, and thus it is not required to perform separate abrasion processing and the like on a protrusion member, an external wall, or the like, and winding loss may be reduced.

The first opening OPa1 may be formed in the base BAS of the lower core CREa, and the second opening OPa2 may be formed in the second external wall OTBb of the upper core CREb. Thus, ease of processing may be achieved and radiation of electromagnetic noise may be reduced.

The base BAS in the lower core CREa, the first protrusion member INBa, and the first external wall OTBa may be formed of the same material. Thus, ease of processing may be achieved and radiation of electromagnetic noise may be reduced.

The second base BASb in the upper core CREb, the second protrusion member INBb, and the second external wall OTBb may be formed of the same material. Thus, ease of processing may be achieved and radiation of electromagnetic noise may be reduced.

Figure 10A:
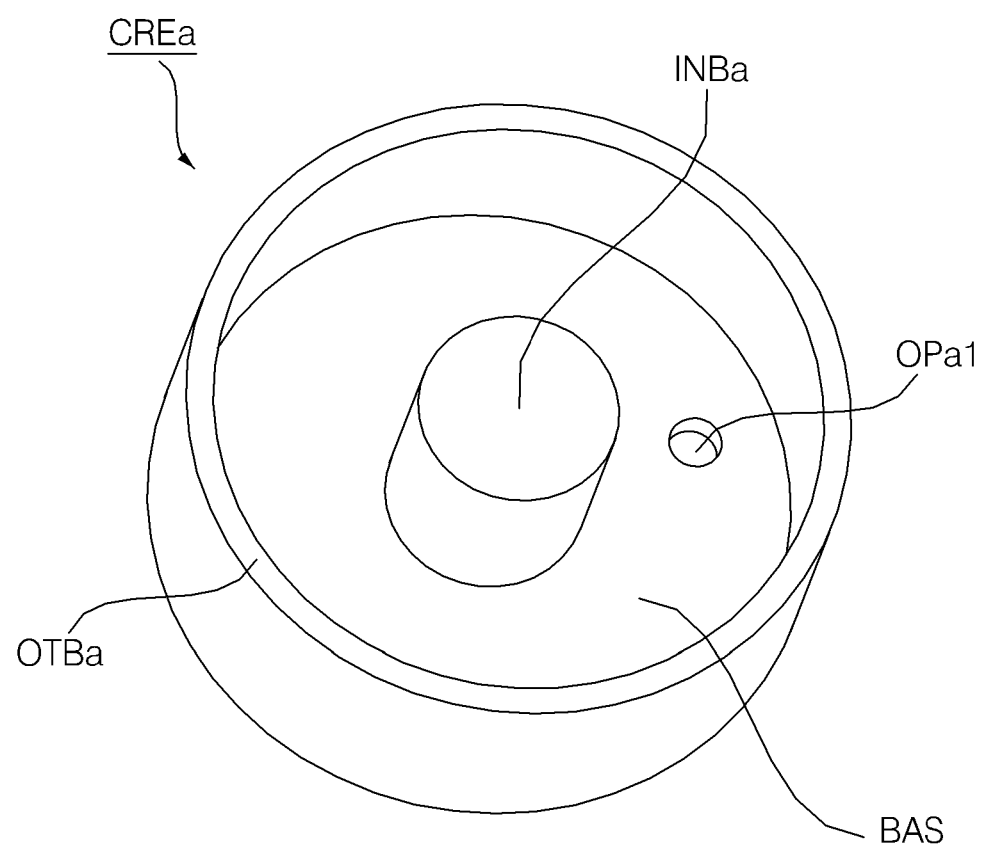
FIGS. 10A to 11B are diagram for explanation of FIG. 9.
Figure 10B:
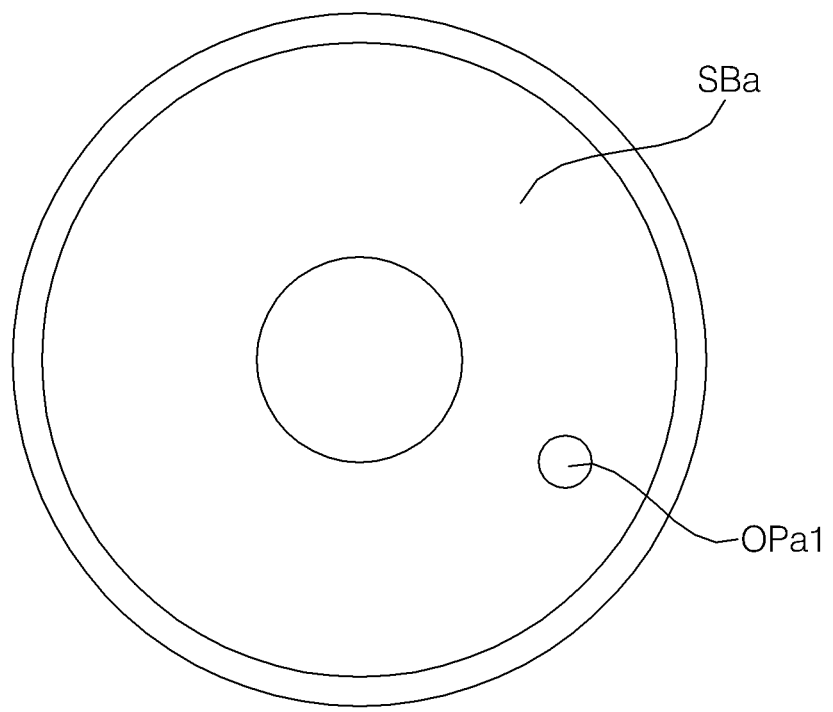

FIG. 10A is a diagram showing a top surface of the lower core CREa. FIG. 10B is a diagram showing a bottom surface of the lower core CREa.

Referring to the drawings, the first opening OPa1 may be formed in the base BAS between the first protrusion member INBa and the first external wall OTBa. Thus, ease of processing may be achieved and radiation of electromagnetic noise may be reduced.

Figure 10C:
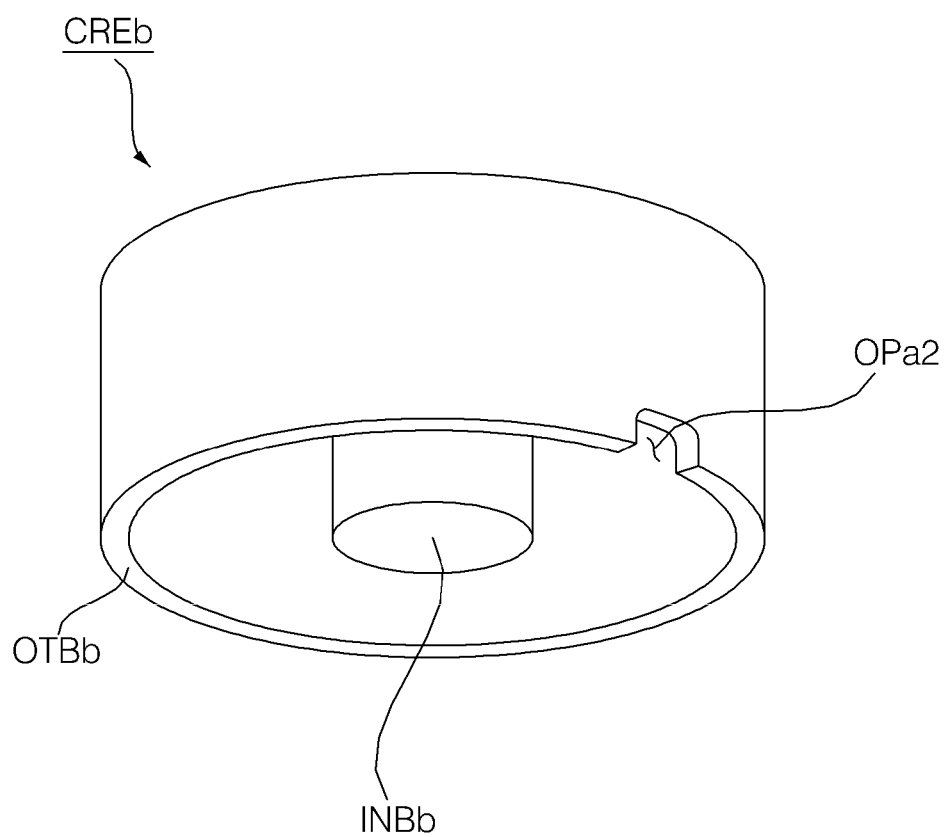
Figure 10D:
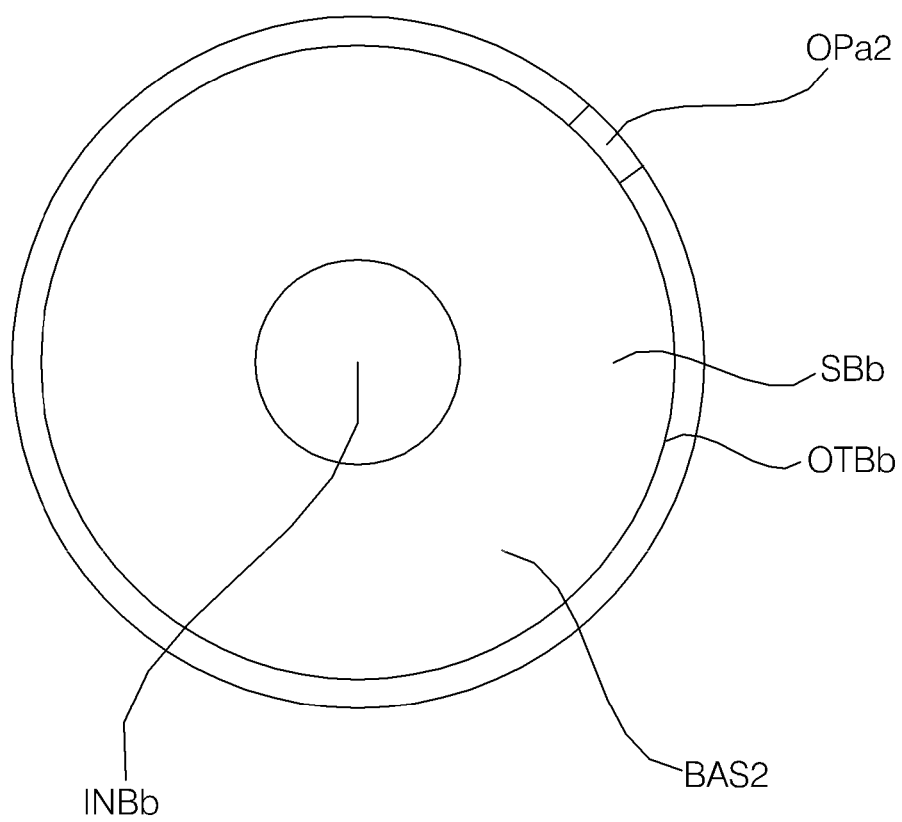

FIG. 10C is a bottom surface of the upper core CREb. FIG. 10B is a top surface of the upper core CREb.

Referring to the drawings, the second opening OPa2 may be formed in the lower end of the second external wall OTBb. Thus, ease of processing may be achieved and radiation of electromagnetic noise may be reduced.

Figure 10E:
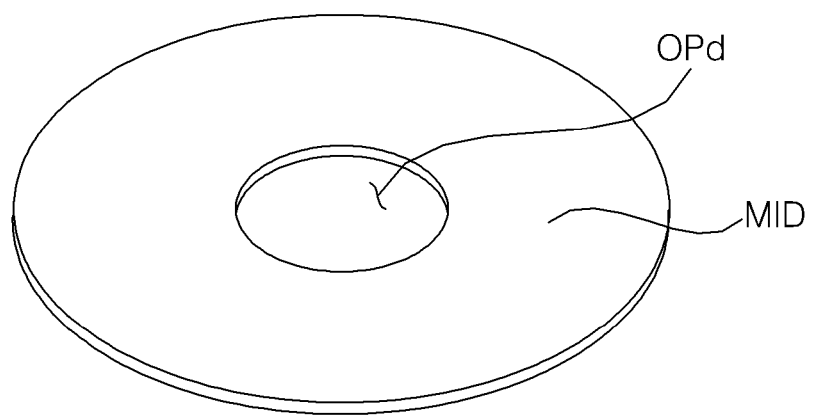

FIG. 10E is a diagram showing the barrier rib MID.

Referring to the drawing, the opening OPd may be formed in the barrier rib MID at a position corresponding to the first protrusion member INBa and the second protrusion member INBb. Thus, ease of processing may be achieved and radiation of electromagnetic noise may be reduced.

The barrier rib MID may include a magnetic material, and thus the first winding CLE1 and the second winding CLE2 may be spaced apart from each other, and inductance may be adjusted.

Figure 11A:
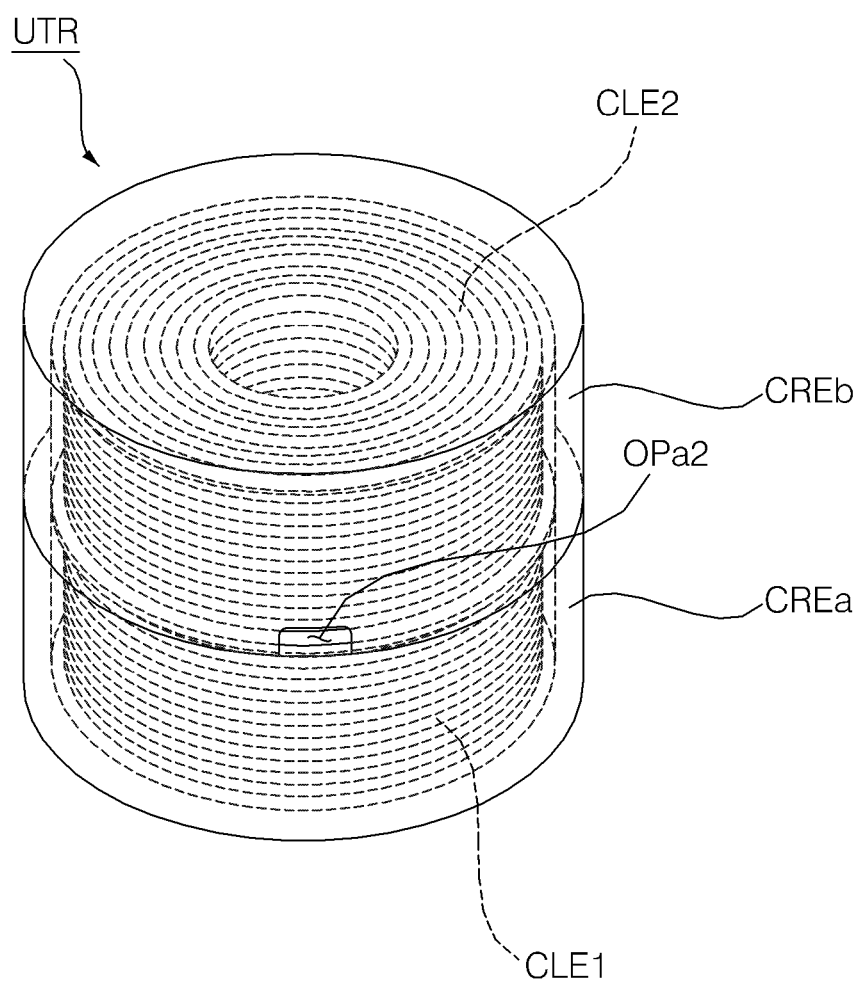

FIG. 11A illustrates an example in which the first winding CLE1 and the second winding CRE2 are wound in the upper core CREb and the lower core CREa, respectively.

Figure 11B:
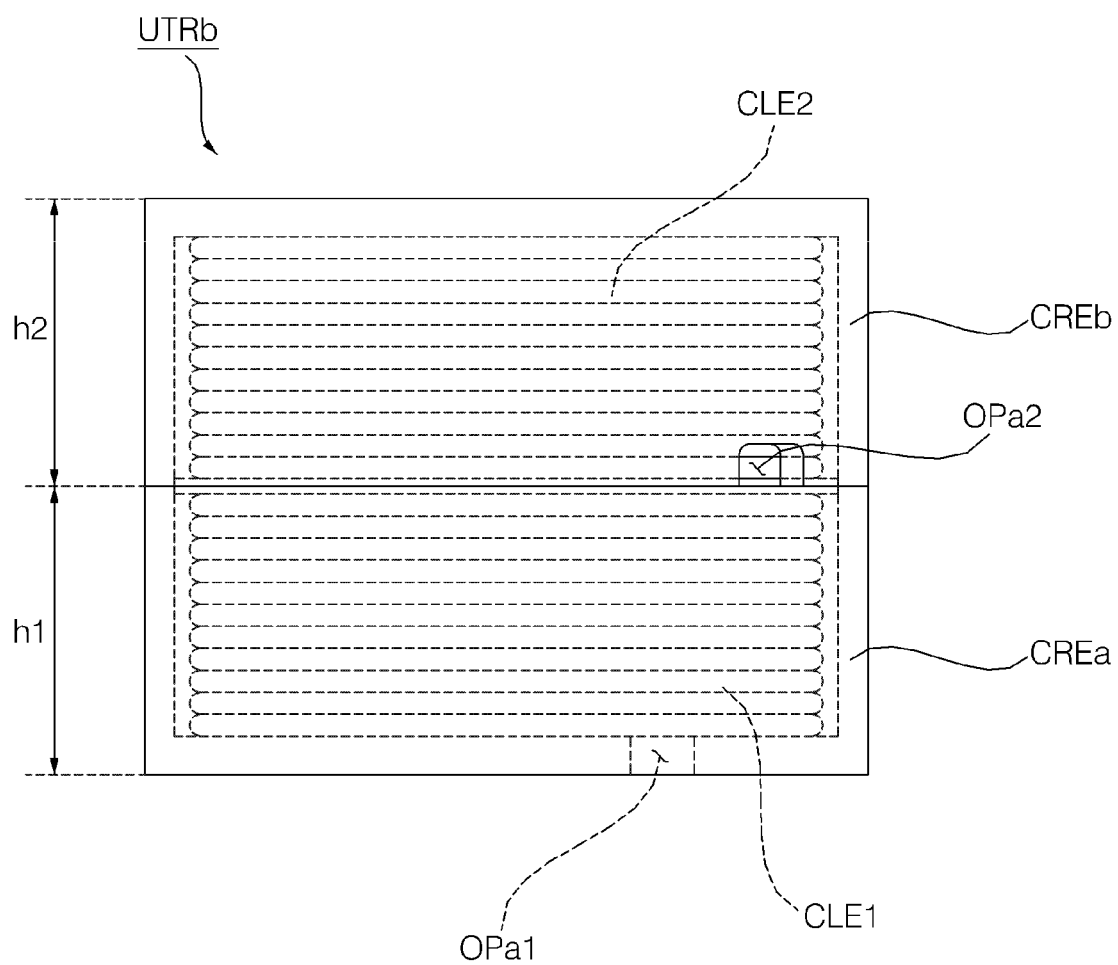

The upper core CREb and the lower core CREa may be h2 and h1, respectively, which are the same, as shown in FIG. 11B.

Thus, the first winding CLE1 and the second winding CLE2 may be the same length, and as a result, copper loss due to a difference of windings may be reduced.

Figure 12:
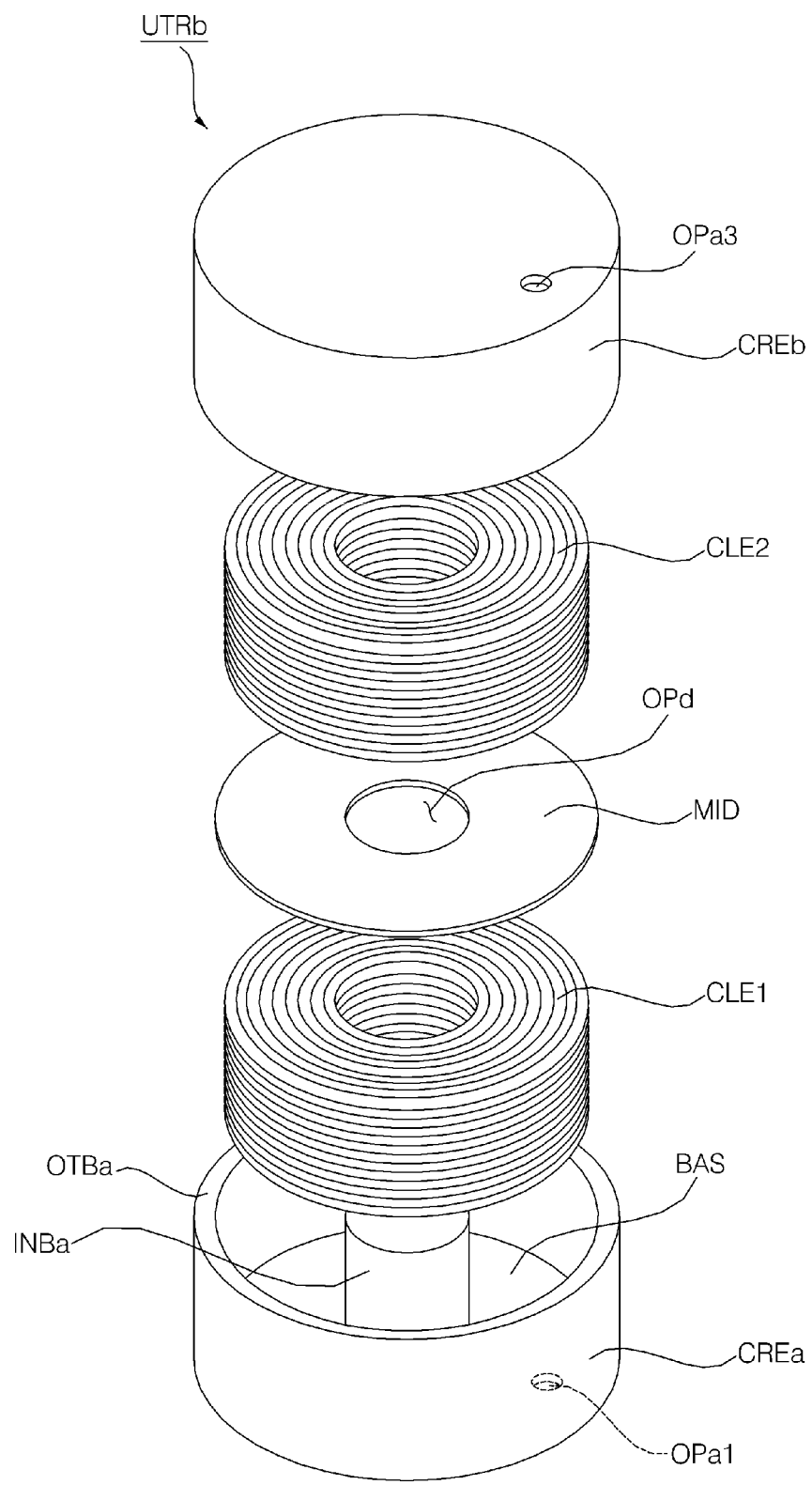
FIG. 12 is a diagram showing a transformer according to another embodiment of the present disclosure.

FIG. 12 is a diagram showing a transformer according to another embodiment of the present disclosure. FIGS. 13A to 14B are diagrams for explanation of FIG. 12.

First, referring to FIG. 12, a transformer UTRb according to another embodiment of the present disclosure may include the lower core CREa, the upper core CREb, the first winding CLE1 wound in the lower core CREa, the second winding CRE2 wound in the upper core CREb, and the barrier rib MID that separates the first winding CLE1 and the second winding CLE2 from each other.

First, the lower core CREa may include the base BAS, the first protrusion member INBa, which protrudes from the base BAS, and the first external wall OTBa, which is spaced apart from the first protrusion member INBa and surrounds the first protrusion member INBa.

Then, the upper core CREb may include the second base BASb, the second protrusion member INBb, which protrudes from the second base BASb, and the second external wall OTBb, which is spaced apart from the second protrusion member INBb and surrounds the second protrusion member INBb.

The first winding CLE1 may be wound in the lower core CREa, and the second winding CRE2 may be wound in the upper core CREb.

In this case, the barrier rib MID may separate the first winding CLE1 and the second winding CLE2 from each other. Thus, ease of processing may be achieved and radiation of electromagnetic noise may be reduced.

The size of the transformer in the photovoltaic module may be reduced, and a transformer including a leakage inductor integrated therewith may be manufactured.

The opening OPd may be formed in the barrier rib MID at a position corresponding to the first protrusion member INBa and the second protrusion member INBb. Thus, ease of processing may be achieved and radiation of electromagnetic noise may be reduced.

The barrier rib MID may include a magnetic material. Thus, the first winding CLE1 and the second winding CLE2 may be spaced part from each other, and inductance may be adjusted.

The first winding CLE1 and the second winding CLE2 may be the same length. Thus, copper loss due to windings may be reduced.

The first opening OPa1 for the first winding CLE1 may be formed in the lower core CREa, and a second opening OPa3 for the second winding CLE2 may be formed in the upper core CREb. Thus, the winding may extend to the outside through an opening, and thus it is not required to perform separate abrasion processing or the like on a protrusion member, an external wall, or the like, and winding loss may be reduced.

The first opening OPa1 may be formed in the base BAS of the lower core CREa, and the second opening OPa3 may be formed in the second base BASb of the upper core CREb. Thus, ease of processing may be achieved, and radiation of electromagnetic noise may be reduced.

The base BAS in the lower core CREa, the first protrusion member INBa, and the first external wall OTBa may be formed of the same material. Thus, ease of processing may be achieved, and radiation of electromagnetic noise may be reduced.

The second base BASb in the upper core CREb, the second protrusion member INBb, and the second external wall OTBb may be formed of the same material. Thus, ease of processing may be achieved and radiation of electromagnetic noise may be reduced.

Figure 13A:
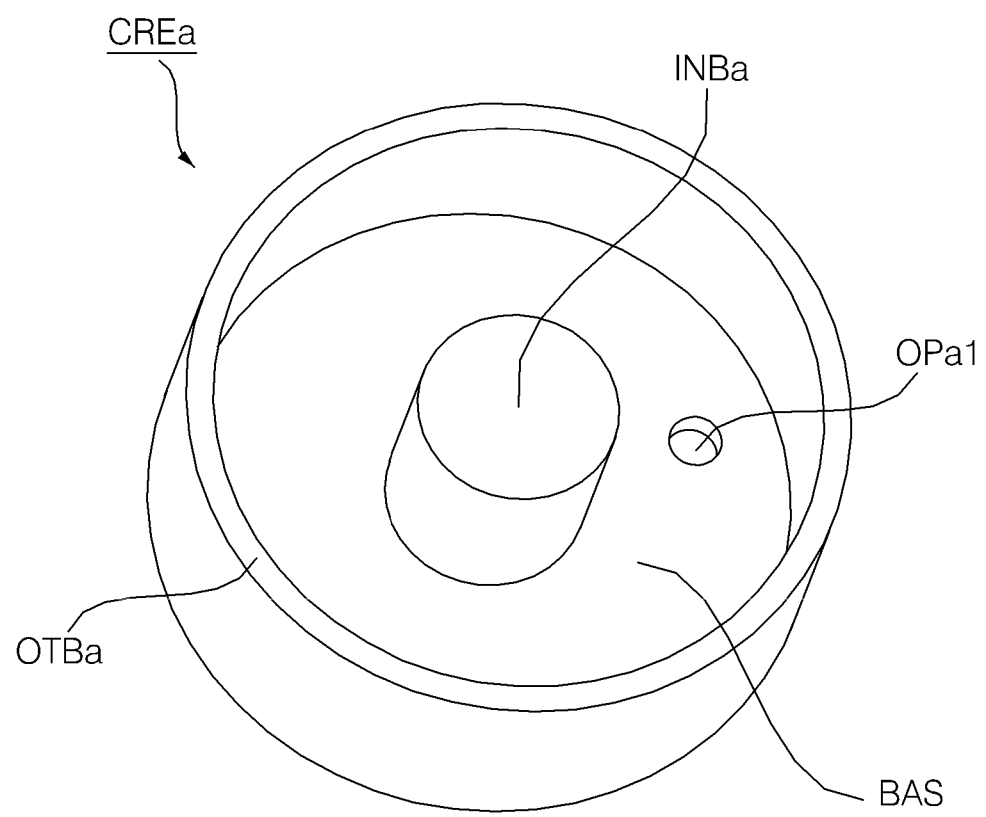
FIGS. 13A to 14B are diagrams for explanation of FIG. 12.
Figure 13B:
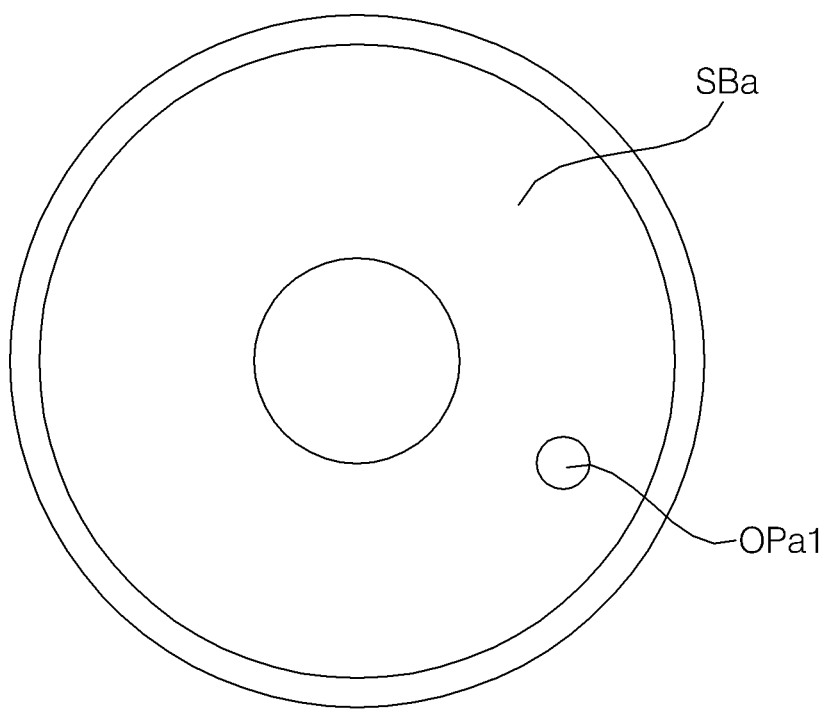

FIG. 13A is a diagram showing a top surface of the lower core CREa. FIG. 13B is a diagram showing a bottom surface of the lower core CREa.

Referring to the drawings, the first opening OPa1 may be formed in the base BAS between the first protrusion member INBa and the first external wall OTBa. Thus, ease of processing may be achieved and radiation of electromagnetic noise may be reduced.

Figure 13C:
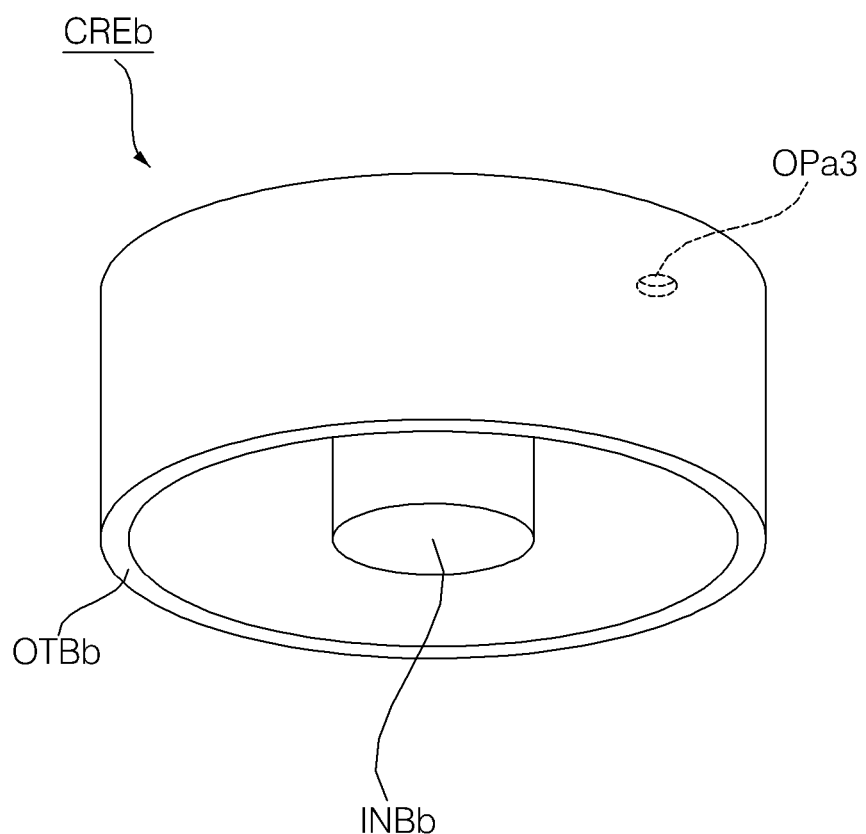
Figure 13D:
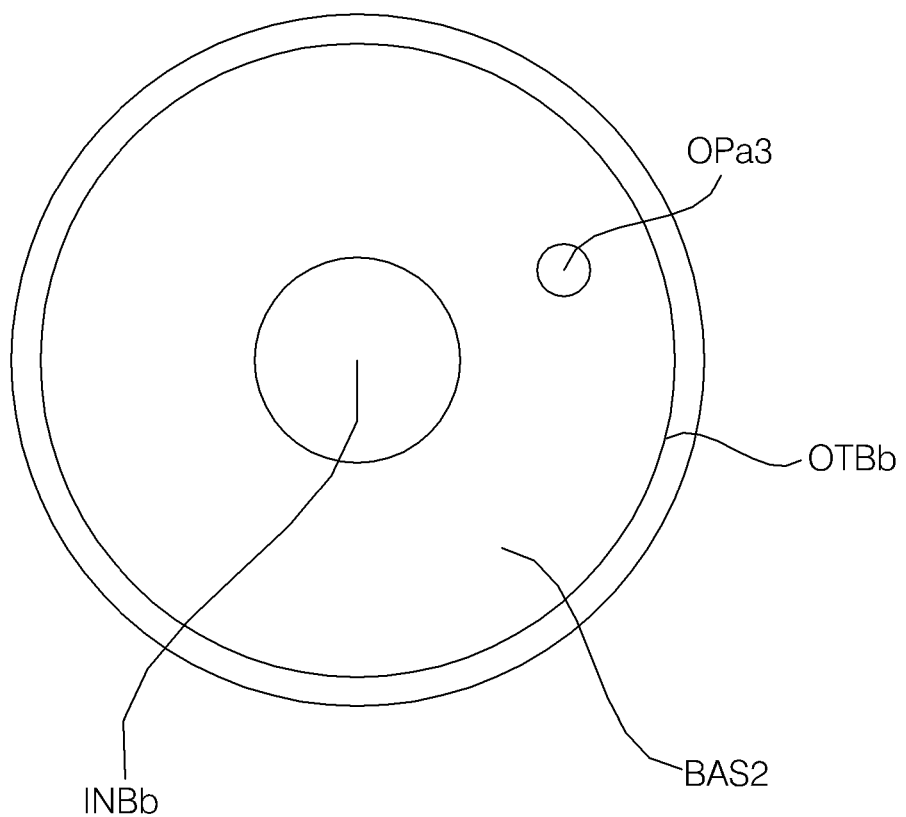

FIG. 13C is a diagram showing a bottom surface of the upper core CREb. FIG. 13B is a diagram showing an upper surface of the upper core CREb.

Referring to the drawings, the second opening OPa3 may be formed in the second base BASb of the upper core CREb. Thus, ease of processing may be achieved and radiation of electromagnetic noise may be reduced.

Figure 13E:
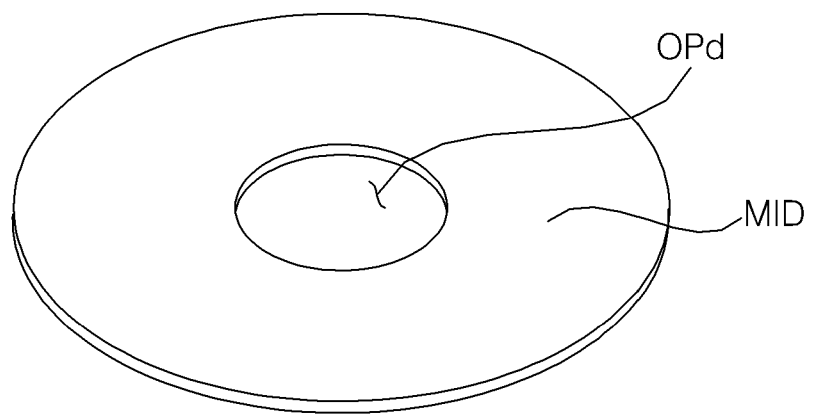

FIG. 13E is a diagram showing the barrier rib MID.

Referring to the drawing, the opening OPd may be formed in the barrier rib MID at a position corresponding to the first protrusion member INBa and the second protrusion member INBb. Thus, ease of processing may be achieved and radiation of electromagnetic noise may be reduced.

The barrier rib MID may include a magnetic material, and thus, the first winding CLE1 and the second winding CLE2 may be spaced apart from each other, and inductance may be adjusted.

Figure 14A:
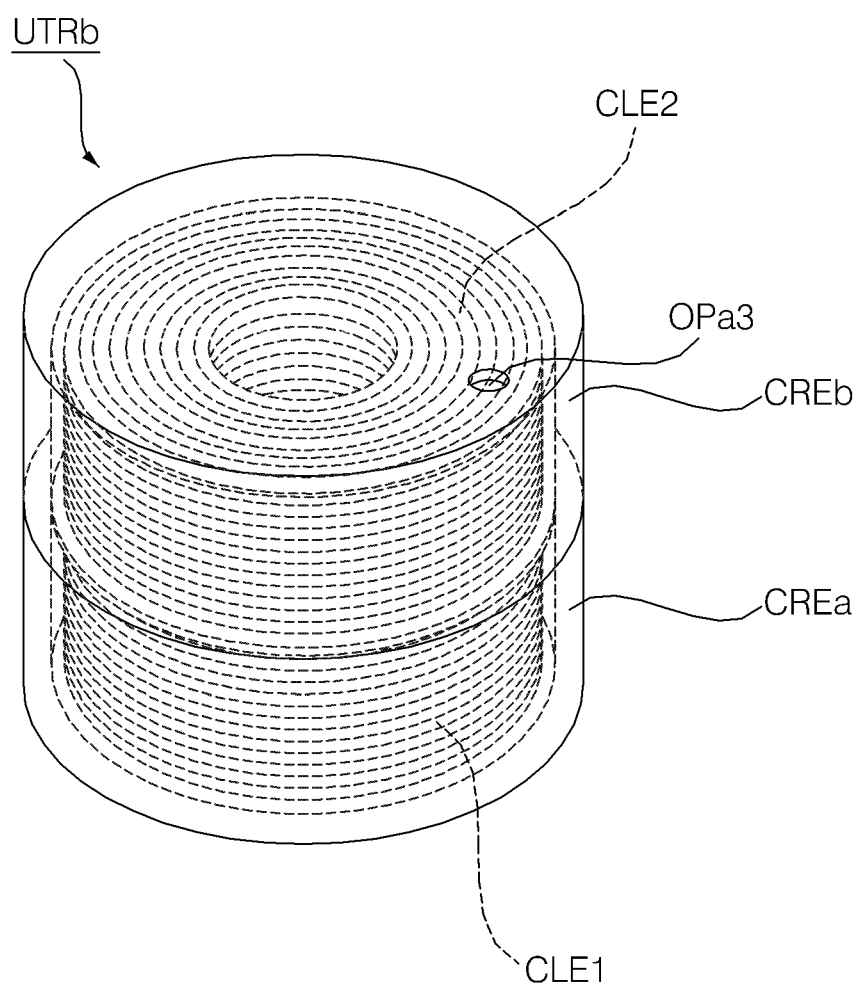
Figure 14B:
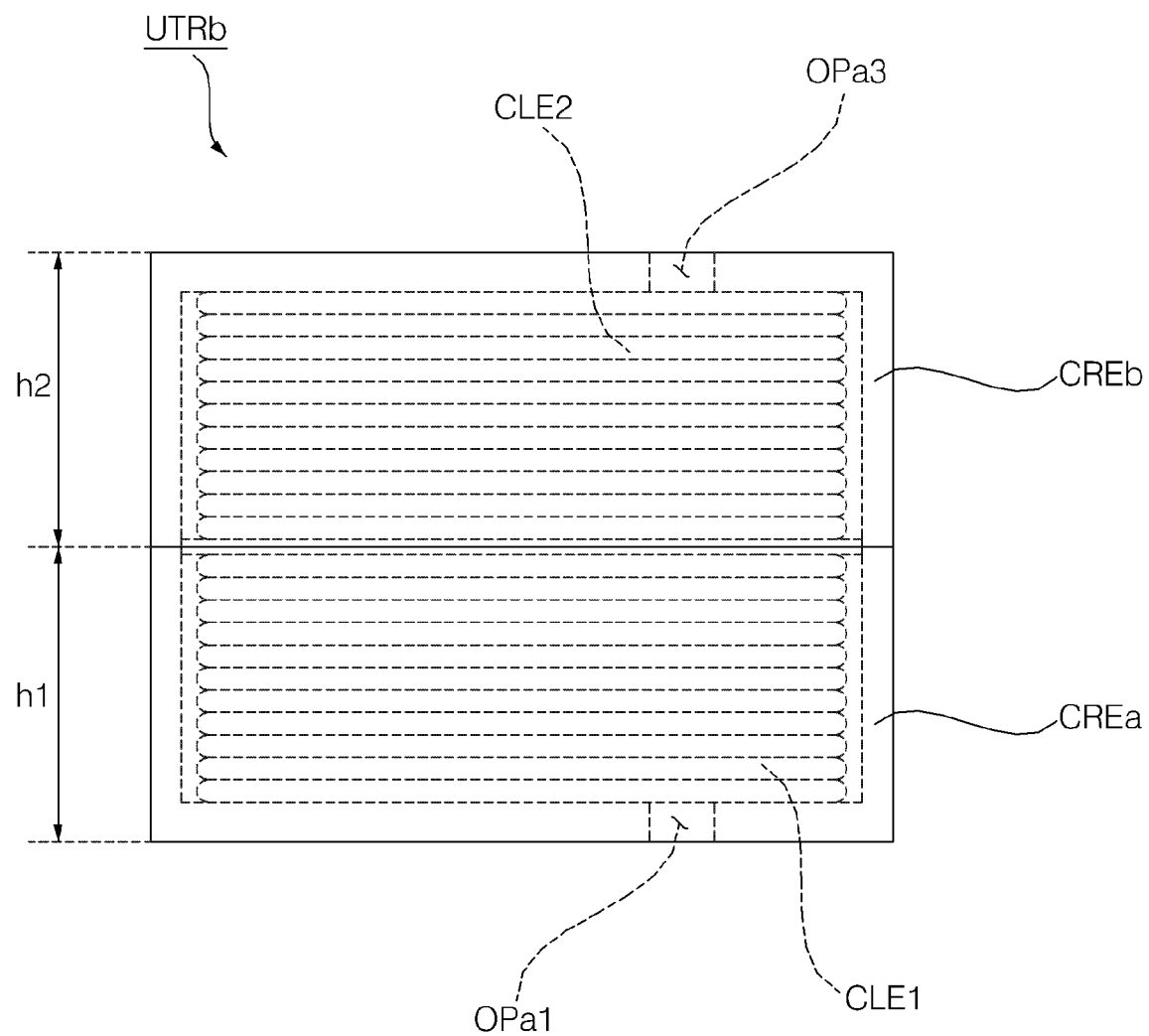

FIG. 14A is a diagram showing an example in which the first winding CLE1 and the second winding CRE2 are wound in the upper core CREb and the lower core CREa, respectively. The upper core CREb and the lower core CREa may be h2 and h1, respectively, which are the same, as shown in FIG. 14B.

Thus, the first winding CLE1 and the second winding CLE2 may be the same length, and as a result, copper loss due to a difference of windings may be reduced.

The first winding CLE1 may correspond to a primary side of the transformer 536 of FIG. 6, and the second winding CLE2 may correspond to a secondary side of the transformer 536 of FIG. 6.

Figure 15:
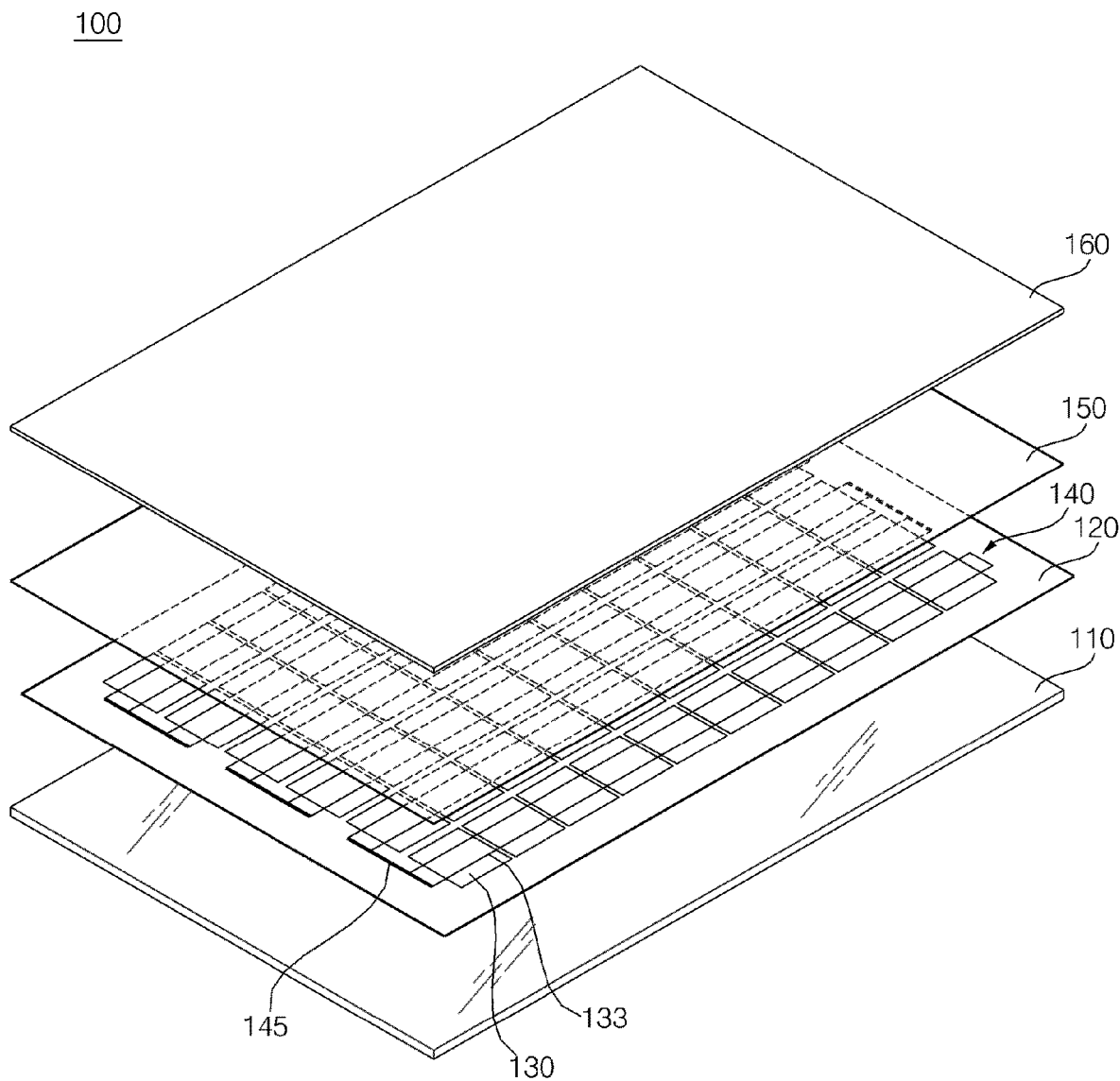
FIG. 15 is an exploded perspective view of a solar cell module of FIG. 1 or 2.

FIG. 15 is an exploded perspective view of a solar cell module of FIG. 1 or 2.

Referring to FIG. 15, the solar cell module 100 of FIG. 1 or 2 may include the plurality of solar cells 130. In addition, the solar cell module 100 may further include a first sealing member 120 and a second sealing member 150, which are positioned on lower and upper surfaces of the plurality of solar cells 130, respectively, a rear substrate 110 positioned on a lower surface of the first sealing member 120, and a front substrate 160 positioned on an upper surface of the second sealing member 150.

First, the solar cell 130 may be a semiconductor device for converting solar energy into electrical energy, and may be a silicon solar cell, a compound semiconductor solar cell, a tandem solar cell, a dye-sensitized solar cell, CdTe, a CIGS type solar cell, a thin film solar cell, or the like.

The solar cell 130 may be formed by a light incident surface on which sunlight is incident, and the back, which is the side opposite to the light incident surface. For example, the solar cell 130 may include a first conductive type silicon substrate, a second conductive type semiconductor layer formed on the silicon substrate and having a conductive type opposite that of the first conductive type, an anti-reflection film including at least one opening for exposing a portion of the surface of the second conductive type semiconductor layer and formed on the second conductive type semiconductor layer, a front electrode that contacts a portion of the surface of the second conductive type semiconductor layer that is exposed through at least one opening, and a rear electrode formed on a rear surface of the silicon substrate.

The solar cells 130 may be conductively connected to each other in series, parallel, or series-parallel. In detail, the plurality of solar cells 130 may be conductively connected to each other by a ribbon 133. The ribbon 133 may be coupled to a front electrode, formed on the light incident surface of the solar cell 130, and to a rear current collector electrode formed on the back of another solar cell 130 adjacent to the above-noted solar cell.

The drawing illustrates an example in which the ribbons 133 are formed in two lines, and the solar cells 130 are connected in one line by the ribbons 133 to form a solar cell string 140.

For example, six strings may be formed, and each string may include ten solar cells.

The rear substrate 110 may be a back sheet, may perform a waterproofing function, an insulation function, and a sun screen function, and may be of a Tedlar/PET/Tedlar (TPT) type, but the present disclosure is not limited thereto. Although FIG. 3 illustrates that the rear substrate 110 is shaped like a rectangular shape, the rear substrate 110 may be manufactured in various shapes such as a circular shape or a semicircular shape depending on an environment in which the solar cell module 100 is installed.

The first sealing member 120 may be attached onto the rear substrate 110, and may be formed to be the same size as the rear substrate 110, and the plurality of solar cells 130 may be positioned to neighbor each other to form several columns on the first sealing member 120.

The second sealing member 150 may be positioned on the solar cell 130 and may be coupled to the first sealing member 120 via lamination.

Here, the first sealing member 120 and the second sealing member 150 may chemically couple elements of a solar cell to each other. The first sealing member 120 and the second sealing member 150 may be variously exemplified, and may be, for example, an ethylene vinyl acetate (EVA) film.

The front substrate 160 may be positioned on the second sealing member 150 to allow sunlight to be transmitted therethrough, and may be a tempered glass in order to protect the solar cell 130 from external shocks or the like. In detail, the front substrate 160 may be low-iron tempered glass with a small amount of iron in order to prevent sunlight from being reflected and to increase transmissivity of sunlight.

The transformer, the power conversion apparatus or the photovoltaic module including the transformer according to the present disclosure may include a first core including a base, a first protrusion member to protrude from the base, and a first external wall spaced apart from the first protrusion member and to surround the first protrusion member, a first winding wound in the first core, a second core including a second base, a second protrusion member to protrude from the second base, and a second external wall spaced apart from the second protrusion member and to surround the second protrusion member, a second winding wound in the second core, and a barrier rib configured to separate the first winding and the second winding from each other. Accordingly, ease of processing may be achieved and radiation of electromagnetic noise may be reduced.

The size of the transformer may be reduced, and the transformer including a leakage inductor integrated therewith may be manufactured. Thus, the power conversion apparatus may be miniaturized, and may be configured in an integrated form, and thus it may be possible to provide a micro inverter suitable for a photovoltaic module that outputs AC power.

An opening may be formed in the barrier rib at a position corresponding to the first protrusion member and the second protrusion member. Thus, ease of processing may be achieved and radiation of electromagnetic noise may be reduced.

The barrier rib may include a magnetic material. Thus, the first winding and the second winding may be spaced apart from each other, and inductance may be adjusted.

The first winding and the second winding may be the same length. Thus, copper loss due to windings may be reduced.

A first opening for a first winding may be formed in the first core, and a second opening for a second winding may be formed in the second core. Thus, a thus it is not required to perform separate abrasion processing or the like on a protrusion member, an external wall, or the like, and winding loss may be reduced.

The first opening may be formed in the base of the first core, and the second opening may be formed in the second external wall of the second core. Thus, ease of processing may be achieved and radiation of electromagnetic noise may be reduced.

The first opening may be formed in the base of the first core, and the second opening may be formed in the second base of the second core. Thus, ease of processing may be achieved and radiation of electromagnetic noise may be reduced.

The height of the first core may be greater than the height of the second core. Thus, more winding may be wound in the first core.

The base, the first protrusion member, and the external wall may be formed of the same material. Thus, ease of processing may be achieved and radiation of electromagnetic noise may be reduced.

The second base, the second protrusion member, and the second external wall may be formed of the same material. Thus, ease of processing may be achieved and radiation of electromagnetic noise may be reduced.

The transformer, the power conversion apparatus or the photovoltaic module including the transformer according to the present disclosure are not limited to the configurations and methods of the above-described embodiments. That is, the above-described embodiments may be partially or wholly combined to make various modifications.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A transformer comprising:
   a first core that includes a first base, a first protrusion member that protrudes from the first base, and a first external wall that is spaced apart from the first protrusion member and that surrounds the first protrusion member;
   a first winding in the first core;
   a second core that includes a second base, a second protrusion member that protrudes from the second base, and a second external wall that is spaced apart from the second protrusion member and that surrounds the second protrusion member;
   a second winding in the second core; and
   a barrier rib configured to separate the first winding and the second winding from each other,
   wherein the first winding is wound around the first protrusion member and disposed within the first external wall such that the first winding does not protrude beyond the first external wall,
   wherein the second winding is wound around the second protrusion member and disposed within the second external wall such that the second winding does not protrude beyond the second external wall,
   wherein the first base defines a first opening between the first protrusion member and the first external wall, and
   wherein a distance between the first opening and the first external wall is less than a distance between the first opening and the first protrusion member.

2. The transformer of claim 1, wherein the barrier rib includes an opening at a position corresponding to the first protrusion member of the first core and the second protrusion member of the second core.

3. The transformer of claim 1, wherein the barrier rib comprises a magnetic material.

4. The transformer of claim 1, wherein the first core and the second core have a same height, and
   wherein the first winding and the second winding have a same length.

5. The transformer of claim 1, wherein the first core includes the first opening for the first winding, and
   wherein the second core includes a second opening for the second winding.

6. The transformer of claim 5,
   wherein the second opening is located in the second external wall of the second core.

7. The transformer of claim 5,
   wherein the second opening is located in the second base of the second core.

8. The transformer of claim 1,
   wherein a height of the first core is greater than a height of the second core, and
   wherein the first winding of the first core is longer than the second winding of the second core.

9. The transformer of claim 1, wherein the first base, the first protrusion member, and the first external wall are formed by a same material.

10. The transformer of claim 1, wherein the second base, the second protrusion member, and the second external wall are formed by a same material.

11. A power conversion apparatus that includes a transformer, the transformer comprising:
   a first core that includes a first base, a first protrusion member that protrudes from the first base, and a first external wall that is spaced apart from the first protrusion member and that surrounds the first protrusion member;
   a first winding in the first core;
   a second core that includes a second base, a second protrusion member that protrudes from the second base, and a second external wall that is spaced apart from the second protrusion member and that surrounds the second protrusion member;
   a second winding in the second core; and
   a barrier rib configured to separate the first winding and the second winding from each other,
   wherein the first winding is wound around the first protrusion member and disposed within the first external wall such that the first winding does not protrude beyond the first external wall, wherein the second winding is wound around the second protrusion member and disposed within the second external wall such that the second winding does not protrude beyond the second external wall, wherein the first base defines a first opening between the first protrusion member and the first external wall, and wherein a distance between the first opening and the first external wall is less than a distance between the first opening and the first protrusion member.

12. The power conversion apparatus of claim 11, wherein the barrier rib includes an opening at a position corresponding to the first protrusion member of the first core and the second protrusion member of the second core.

13. The power conversion apparatus of claim 11, wherein the barrier rib comprises a magnetic material.

14. The power conversion apparatus of claim 11, wherein the first core and the second core have a same height, and wherein the first winding and the second winding have a same length.

15. The power conversion apparatus of claim 11, wherein the first core includes the first opening for the first winding, and wherein the second core includes a second opening for the second winding.

16. The power conversion apparatus of claim 15, wherein the second opening is located in the second external wall of the second core.

17. The power conversion apparatus of claim 15, wherein the second opening is located in the second base of the second core.

18. The power conversion apparatus of claim 11, further comprising:

a convertor configured to convert a first DC power at an input side of the convertor to a second DC power at an output side of the converter, the convertor includes:

a full bridge inverter connected to an input side of the transformer; and a half bridge switching unit connected to an output side of the transformer, wherein the transformer is coupled to the full bridge inverter and the half bridge switching unit.

19. The power conversion apparatus of claim 18, further comprising:

an inverter connected to an output side of the half bridge switching unit, and configured to convert the second DC power to an AC power.

20. A photovoltaic device that includes a power conversion apparatus that comprises a transformer, wherein the transformer includes:

a first core that includes a first base, a first protrusion member that protrudes from the first base, and a first external wall that is spaced apart from the first protrusion member and that surrounds the first protrusion member;

a first winding in the first core;

a second core that includes a second base, a second protrusion member that protrudes from the second base, and a second external wall that is spaced apart from the second protrusion member and that surrounds the second protrusion member;

a second winding in the second core; and a barrier rib configured to separate the first winding and the second winding from each other, wherein the first winding is wound around the first protrusion member and disposed within the first external wall such that the first winding does not protrude beyond the first external wall, wherein the second winding is wound around the second protrusion member and disposed within the second external wall such that the second winding does not protrude beyond the second external wall, wherein the first base defines a first opening between the first protrusion member and the first external wall, and wherein a distance between the first opening and the first external wall is less than a distance between the first opening and the first protrusion member.

* * * * *